(12) United States Patent
Fujiwara

(10) Patent No.: US 11,495,970 B2
(45) Date of Patent: Nov. 8, 2022

(54) PHOTOVOLTAIC POWER GENERATION SYSTEM AND PHOTOVOLTAIC POWER GENERATION METHOD

(71) Applicant: Toshiba Mitsubishi-Electric Industrial Systems Corporation, Tokyo (JP)

(72) Inventor: Naoki Fujiwara, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 16/646,143

(22) PCT Filed: Sep. 19, 2017

(86) PCT No.: PCT/JP2017/033742
§ 371 (c)(1),
(2) Date: Mar. 11, 2020

(87) PCT Pub. No.: WO2019/058428
PCT Pub. Date: Mar. 28, 2019

(65) Prior Publication Data
US 2020/0220357 A1   Jul. 9, 2020

(51) Int. Cl.
*H02J 3/38* (2006.01)
*H02S 40/32* (2014.01)

(52) U.S. Cl.
CPC ............ *H02J 3/381* (2013.01); *H02S 40/32* (2014.12); *H02J 2300/26* (2020.01)

(58) Field of Classification Search
CPC .... H02J 3/38; H02J 3/381; H02J 3/383; H02J 2300/26; H02J 3/46; H02S 40/32;
(Continued)

(56) References Cited

U.S. PATENT DOCUMENTS 8,080,898 B2 *  12/2011  Fukuhara ............... H02J 3/382
                                                           307/48
8,574,741 B2 *  11/2013  Sato ................... H01M 10/3909
                                                           429/121
(Continued)

FOREIGN PATENT DOCUMENTS

JP        2000-003224 A       1/2000
JP        3480321 B2 *       12/2003
(Continued)

OTHER PUBLICATIONS

Office Action dated Dec. 1, 2020, in corresponding Indian patent Application No. 202017007811, 5 pages.
(Continued)

*Primary Examiner* — Pinping Sun
(74) *Attorney, Agent, or Firm* — Xsensus LLP

(57) ABSTRACT

A photovoltaic power generation system includes a plurality of photovoltaic cell arrays, a plurality of power conditioners connected respectively with the plurality of photovoltaic cell arrays, and a high order device connected to the plurality of power conditioners. The high order device is configured to execute: a first output control to adjust output power of a designated power conditioner to a predetermined output power amount being set in advance; and a second output control to adjust output power from a remaining power conditioner which is other than the designated power conditioner among the plurality of power conditioners. The high order device is configured to execute characteristic-data acquisition to acquire an input/output electrical characteristic of the designated power conditioner during execution of the first output control.

14 Claims, 15 Drawing Sheets

(58) Field of Classification Search
CPC .......... H02S 50/00; Y02E 10/56; H02M 7/48; H02M 7/493
USPC .................................. 307/82, 80, 87, 66, 64
See application file for complete search history.

(56) References Cited

U.S. PATENT DOCUMENTS

| | | | | |
|---|---|---|---|---|
| 8,786,139 | B2* | 7/2014 | Cummings | H01L 31/02021 307/151 |
| 2009/0218887 | A1* | 9/2009 | Ledenev | H02J 13/0003 307/80 |
| 2011/0208372 | A1* | 8/2011 | Hansen | G05F 1/67 700/297 |
| 2012/0139499 | A1* | 6/2012 | Tanaka | H02J 3/008 320/134 |
| 2012/0205985 | A1* | 8/2012 | Inakagata | H02J 3/46 307/82 |
| 2012/0242303 | A1* | 9/2012 | Ishii | G05F 1/67 323/234 |
| 2012/0299387 | A1* | 11/2012 | Izadian | H01L 31/02021 307/97 |
| 2013/0033111 | A1* | 2/2013 | Kawamoto | G05F 1/67 307/66 |
| 2014/0001859 | A1* | 1/2014 | Shimura | G05F 5/00 307/63 |
| 2014/0077608 | A1* | 3/2014 | Nosaka | H02J 3/385 307/77 |
| 2015/0076903 | A1* | 3/2015 | Kanayama | H02J 3/40 307/24 |
| 2015/0222227 | A1 | 8/2015 | Nishizawa et al. | |
| 2016/0172864 | A1* | 6/2016 | Terazono | H02S 40/32 307/82 |
| 2016/0248259 | A1* | 8/2016 | Berger | H02J 3/32 |
| 2017/0187190 | A1* | 6/2017 | Asano | H02J 1/102 |
| 2017/0288413 | A1* | 10/2017 | Varadarajan | H02J 7/007 |
| 2018/0135597 | A1* | 5/2018 | Nayebi | F03D 7/0284 |
| 2020/0044581 | A1* | 2/2020 | Tanaka | H02M 7/53871 |
| 2020/0169093 | A1* | 5/2020 | Wei | F03D 7/0272 |

FOREIGN PATENT DOCUMENTS

| | | | |
|---|---|---|---|
| JP | 2015186390 A | * | 10/2015 |
| JP | 2017017792 A | * | 1/2017 |
| WO | 2014/144354 A2 | | 9/2014 |

OTHER PUBLICATIONS

International Search Report and Written Opinion dated Nov. 14, 2017 for PCT/JP2017/033742 filed on Sep. 19, 2017, 7 pages including English Translation of the International Search Report.

* cited by examiner

PHOTOVOLTAIC POWER GENERATION SYSTEM AND PHOTOVOLTAIC POWER GENERATION METHOD

CROSS-REFERENCE TO RELATED APPLICATION

The present application is based on PCT filing PCT/JP2017/033742, filed Sep. 19, 2017, the entire contents of which are incorporated herein by reference.

TECHNICAL FIELD

The present invention relates to a photovoltaic power generation system and a photovoltaic power generation method.

BACKGROUND

Conventionally, for example, as described in JP 2000-3224, a photovoltaic power generation apparatus capable of performing output performance evaluation of an inverter circuit is known.

CITATION LIST

Patent Literature

[PTL 1] JP 2000-3224 A

SUMMARY

Technical Problem

The above prior art operates one power conditioner alone. Alternatively, photovoltaic power generation systems with a plurality of photovoltaic cell arrays and a plurality of power conditioners have become popular. In this type of photovoltaic power generation system, the plurality of power conditioners are operated in parallel so that the plurality of photovoltaic cell arrays share an amount of power generation required for the system is optimally.

One of important performance characteristics of the power conditioner is conversion efficiency. The conversion efficiency is calculated from input and output electrical characteristics of the power conditioner. The conversion efficiency is obtained by dividing AC output power by DC input power.

There is also a method to measure reference conversion efficiency by using a photovoltaic-cell simulator and a virtual grid in a predetermined standard measurement condition. However, the conversion efficiency depends on amount of the input DC voltage to the power conditioner. The amount of the input DC voltage varies depending on conditions such as an amount of received solar radiation of the photovoltaic cell module and the temperature of the photovoltaic cell module. Since natural environment changes every moment, the change also affects the input DC voltage in an actual photovoltaic power generation system.

As a value of the input DC voltage changes, actual conversion efficiency of the power conditioner also changes. There is a problem that only using the reference conversion efficiency measured by the simulator or the like cannot provide accurate evaluation of the actual conversion efficiency of the power conditioner in an installed photovoltaic power generation system when conditions such as the input DC voltage differ variously.

The present invention has been made to solve the problems as described above, and an object thereof is to provide an improved photovoltaic power generation system so that a power conditioner can be evaluated accurately.

Solution to Problem

A photovoltaic power generation system according to a first aspect of the present invention of the present application includes:
  a plurality of photovoltaic cell arrays;
  a plurality of power conditioners connected respectively to the plurality of photovoltaic cell arrays; and
  a high order device connected to the plurality of power conditioners,
  wherein the high order device is configured to execute
    a first output control to adjust output power outputted from a designated power conditioner selected from the plurality of power conditioners to a predetermined output power amount being set in advance,
    a second output control to adjust output power from a remaining power conditioner which is other than the designated power conditioner among the plurality of power conditioners, the second output power control being such that the remaining power conditioner compensates a power generation fluctuation amount caused by adjusting the output power of the designated power conditioner to the predetermined output power amount,
  wherein the first output control is executed so as to overlap the second output control in time,
  wherein at least one of the high order device and the designated power conditioner is configured to execute characteristic-data acquisition to acquire an input/output electrical characteristic of the designated power conditioner during execution of the first output control.

A photovoltaic power generation system according to a second aspect of the present invention of the present application includes:
  a plurality of photovoltaic cell arrays;
  a plurality of power conditioners connected respectively to the plurality of photovoltaic cell arrays; and
  a network system to cause the plurality of power conditioners to communicate with each other,
  wherein the plurality of power conditioners include a master power conditioner and a slave power conditioner,
  wherein the master power conditioner is configured to execute
    a first output control to adjust output power from a designated power conditioner among the plurality of power conditioners to a predetermined output power amount being set in advance,
    a second output control to adjust output power from a remaining power conditioner which is other than the designated power conditioner among the plurality of power conditioners, the second output power control being such that the remaining power conditioner compensates a power generation fluctuation amount caused by adjusting the output power of the designated power conditioner to the predetermined output power amount,
  wherein the first output control is executed so as to overlap the second output control in time,
  wherein at least one of the master power conditioner and the designated power conditioner is configured to execute characteristic-data acquisition, the characteristic-data acquisition acquires an input/output electrical characteristic of the designated power conditioner during execution of the first output control.

In the first aspect of the present invention and the second aspect of the present invention, it is not limited which of execution of the first output control and execution of the second output control will start earlier. Operation in which the first output control is executed so as to overlap the second output control in time may achieve "a condition in which the remaining power conditioner compensates a change in the power generation fluctuation amount of the designated power conditioner." This makes it possible that the entire photovoltaic power generation system can balance with respect to the change in the power generation amount of the designated power conditioner. Therefore, order of execution includes at least the following three examples. As a first example, the high order device or the master power conditioner may start execution of the first output control earlier, and may start execution of the second output control after the start of the first output control. As a second example, the high order device or the master power conditioner may start execution of the second output control after designation of the designated power conditioner, and may start execution of the first output control after the start of the second output control. As a third example, the high order device or the master power conditioner may start execution of the first output control and execution of the second output control simultaneously.

A photovoltaic power generation method according to a third aspect of the present invention of the present application includes:
measuring an input/output electrical characteristic of a designated power conditioner under a condition where output power of the designated power conditioner is adjusted to a predetermined output power amount being set in advance, the designated power conditioner being designated among a plurality of power conditioners connected respectively to a plurality of photovoltaic cell arrays;
adjusting output power from a remaining power conditioner which is other than the designated power conditioner among the plurality of power conditioners, in such a manner that the remaining power conditioner compensates a power generation fluctuation amount caused by adjusting the output power of the designated power conditioner to the predetermined output power amount.

A first step as in the above may be performed so that the first step overlaps a second step as in the above in time. One of the first step and the second step may start earlier than the other, or both steps may start at the same time.

Advantageous Effects of Invention

According to the above-described invention, the remaining power conditioner can compensate the power generation fluctuation amount of the designated power conditioner when the input/output electrical characteristic of the designated power conditioner is acquired. This makes it possible to measure the input/output electrical characteristic of the power conditioner in an actual photovoltaic power generation system, under actual natural environment, without hindering power generation function of the photovoltaic power generation system. As a result, the power conditioner can be evaluated accurately based on the input/output electrical characteristic under the actual installation environment.

DESCRIPTION OF EMBODIMENTS

First Embodiment.

Figure 1:
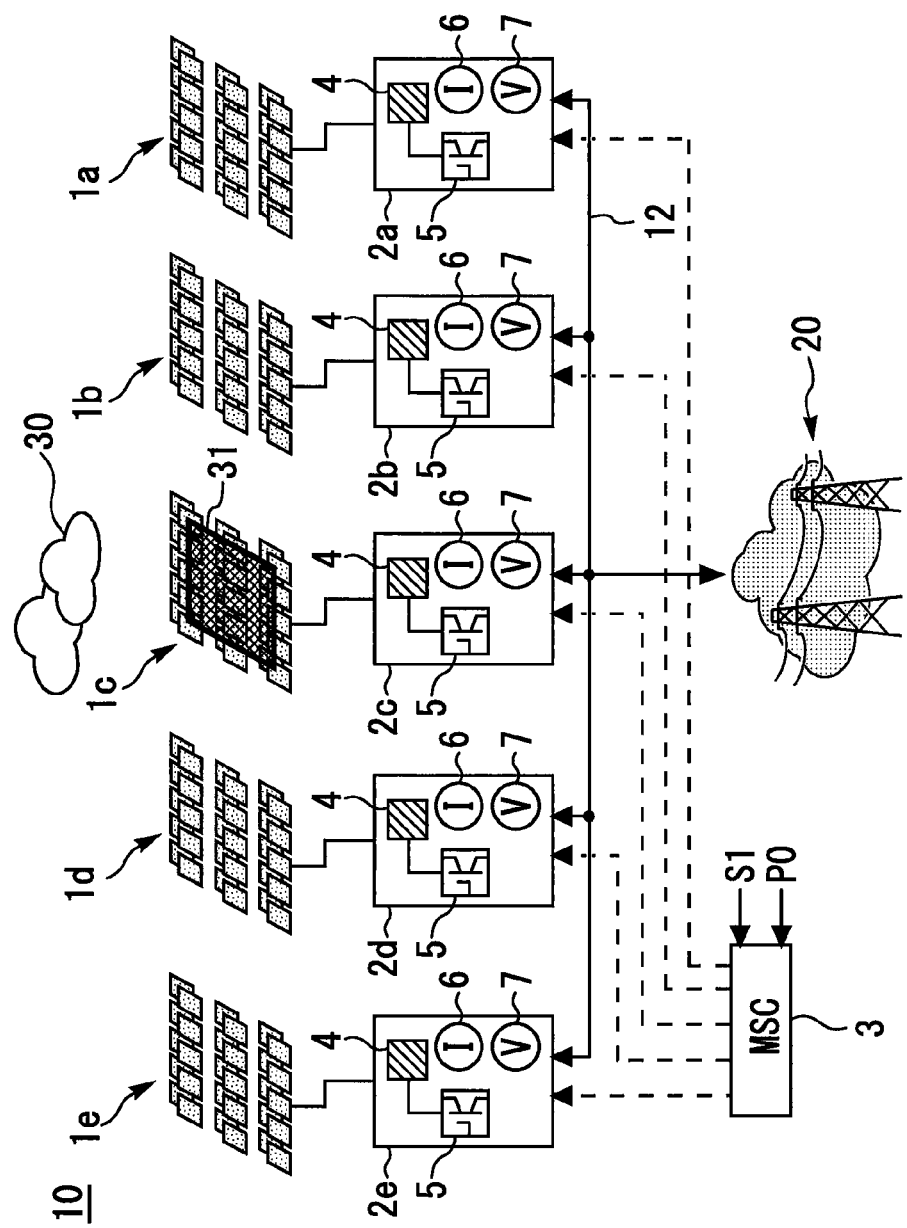
FIG. 1 is a schematic diagram illustrating a photovoltaic power generation system according to a first embodiment of the present invention.

FIG. 1 is a schematic diagram showing a photovoltaic power generation system 10 according to a first embodiment of the present invention. The photovoltaic power generation system 10 includes a plurality of photovoltaic cell arrays 1a to 1e, a plurality of power conditioners 2a to 2e connected respectively to the plurality of photovoltaic cell arrays 1a to 1e, and a main site controller 3 which is a high order device connected to the plurality of power conditioners 2a to 2e. Hereinafter, the main site controller is also referred to as "MSC" for simplicity. The power conditioner is also referred to as a "PC" for simplicity.

The photovoltaic power generation system 10 performs grid interconnection operation. AC power outputted from the plurality of PCs 2a to 2e is supplied to an electric power grid 20 via a power receiving and transforming facility (not shown). In FIG. 1, clouds 30 causes shade 31 on the photovoltaic cell array 1c.

Each of the plurality of PCs 2a to 2e includes a DC input part (not shown), an AC output part (not shown), an inverter control circuit 4, an inverter circuit 5, an ammeter 6, and a voltmeter 7. Each DC input part of the plurality of PCs 2a to 2e receives each DC power from the photovoltaic cell arrays 1a to 1e. The inverter circuit 5 is configured by a plurality of semiconductor switching elements. The inverter circuit 5 converts the DC power inputted to the DC input part into AC power. The AC output part outputs the AC power converted by the inverter circuit 5. The inverter control circuit 4 controls turn-on and turn-off of the semiconductor switching elements in the inverter circuit 5. The ammeter 6 includes an input-side ammeter for measuring input DC current of the inverter circuit 5, and an output-side ammeter for measuring output AC current of the inverter circuit 5. The voltmeter 7 includes an input-side voltmeter for measuring input DC voltage of the inverter circuit 5, and an output-side voltmeter for measuring output AC voltage of the inverter circuit 5.

Each of the plurality of PCs 2a to 2e can measure input and output electrical characteristics by using the ammeter 6 and the voltmeter 7. The input/output electrical characteristics include input voltage, input current, output voltage, output current, power factor, and conversion efficiency of each of the plurality of PCs 2a to 2e. The input/output electrical characteristics may include I-V characteristic curve of each of the photovoltaic cell arrays 1a to 1e.

The MSC 3 receives a predetermined measurement start signal S1, and a total instructed power generation amount P0 with respect to the photovoltaic power generation system 10. The "total instructed power generation amount P0" also includes a power generation suppression instruction given by a central power supply control center, etc. If the power generation suppression instruction is an instruction to suppress output of 20%, the MSC 3 will control the plurality of PCs 2a to 2e so that each of the PCs 2a to 2e operates at a power generation amount which is calculated by subtracting 20% from a maximum power generation amount, wherein the maximum power generation amount can be generated by the entire system including the photovoltaic arrays 1a to 1e and the PCs 2a to 2e connected thereto. The measurement start signal S1 may be a signal that is manually inputted, or may be a signal that is periodically generated by setting schedule previously, or the like.

It should be noted that, in a conventional photovoltaic power generation system, a photovoltaic cell array connected to a PC is often installed so that power generation capacity of the photovoltaic cell array is larger than the maximum output amount of the PC. This is also referred to as "overloading". Even in the case of overloading, a power generation amount is constrained by the maximum output amount of the PC. If this overloading is applied to the photovoltaic power generation system 10, maximum output of a pair of the PC 2a and photovoltaic cell array 1a is limited by the smaller one of the maximum output of the PC 2a and the maximum generation capacity of the photovoltaic cell array 1a, as an example. This is similarly applied to each pair of PCs 2b to 2e and the photovoltaic cell arrays 1b to 1e.

The MSC 3 is configured to execute normal output control when the measurement start signal S1 is not received. The normally output control is such that the plurality of PCs 2a to 2e share the total instructed power generation amount in the photovoltaic power generation system 10 by adjusting each output power of the plurality of PCs 2a to 2e variably. The "normal output control" is also referred to as "output compensation". The output compensation is such that the MSC 3 adjusts each output power of the plurality of PCs 2a to 2e to compensate a power shortage in one PC having small output by an extra power generation amount in another PC, among the plurality of PCs 2a to 2e.

The MSC 3 executes a "first output control" and a "second output control" to be described later upon receiving the measurement start signal S1. The MSC 3 can selectively execute a normal output control, the first output control and the second output control in response to the measurement start signal S1. In this specification, for convenience, the normal output control described above is also referred to as a "third output control".

Figure 2:
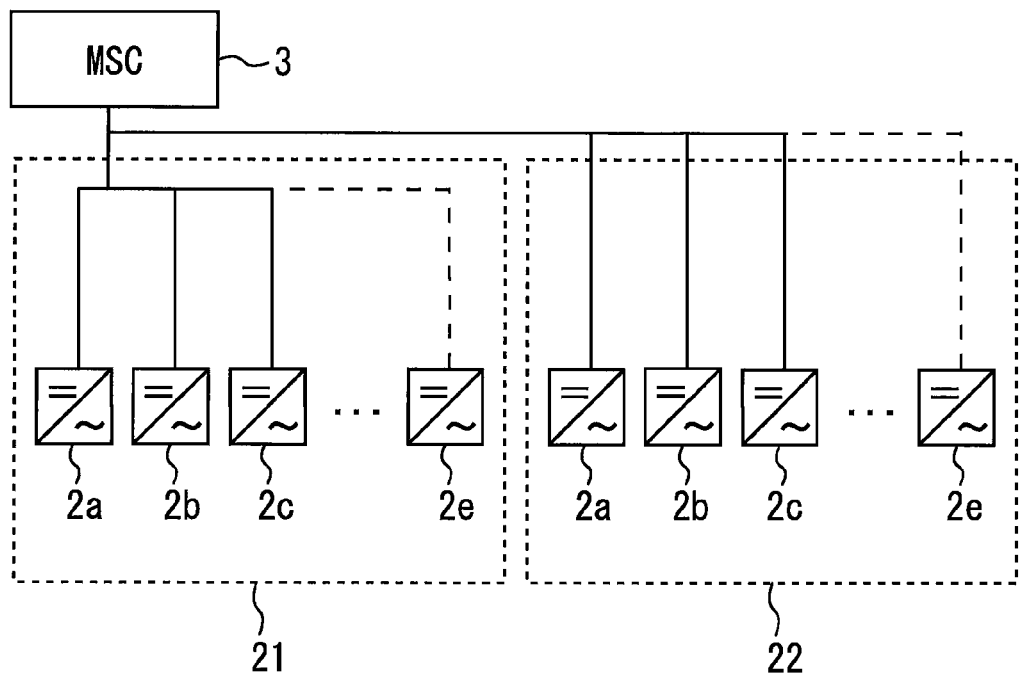
FIG. 2 is a block diagram illustrating connection relationship of power conditioners and a main site controller in the photovoltaic power generation system according to the first embodiment of the present invention.

FIG. 2 is a block diagram illustrating connection relationship of the plurality of PCs 2a to 2e and the MSC 3 in the photovoltaic power generation system 10 according to the first embodiment of the present invention. It should be noted that FIG. 2 illustrates a PC group 21 and a PC group 22. However, this is an example, and it is assumed that the photovoltaic power generation system 10 has only of the PC 2a to 2e in the PC group 21, for consistency with FIG. 1 and for convenience of explanation in the first embodiment.

The MSC 3 is configured to be executable the "first output control" and the "second output control". In the first embodiment, one PC designated among the plurality of PCs 2a to 2e is also referred to as a "designated PC". For convenience of explanation, "PC 2a" is referred as a "designated PC 2a", as an example. Further, in the first embodiment, PCs other than the "designated PC" among the plurality of PCs 2a to 2e is also referred to as "remaining PCs". Here, the "remaining PCs" are PCs 2b to 2e other than the designated PC 2a among the plurality of PCs 2a to 2e. The first output control adjusts output power of the designated PC 2a to a predetermined output power amount which is set in advance. The second output control adjusts each output power of the remaining PCs so that the remaining PCs share a power generation fluctuation amount caused by the first output control during the execution of the first output control. The "power generation fluctuation amount" refers to a fluctuation amount of power generation in the designated PC 2a which is caused by adjusting the output of the designated PC 2a to the predetermined output power amount.

The MSC 3 according to the first embodiment can select one designated PC from the plurality of PCs 2a to 2e. The MSC 3 according to the first embodiment can alternate the designated PC in the plurality of PCs 2a to 2e in a predetermined order. The first embodiment is assumed that the first output control includes adjustment of output power to a plurality of the predetermined output power amount. The first embodiment is assumed that, the plurality of predetermined output power amounts have four points consisting of 25% of rated output power, 50% of rated output power, 75% of rated output power, and 100% of rated output power. As an example, each of the plurality of PCs 2a to 2e is assumed to have rated output power of 500 kW=0.5 MW. In this case, 100% of the rated output power is 500 kW, and 50% of the rated output power is 250 kW. It should be noted that the first embodiment is assumed that each of the plurality of PCs 2a to 2e has the same rated output power.

The "normal output control" will now be described in detail. The first embodiment is assumed that the photovoltaic power generation system 10 has an "output power limit". The output power limit is a mechanism by which the photovoltaic power generation system 10 performs power generation under certain restrictions so as not to exhibit the maximum power generation capacity thereof. Since the output power limit is a known technique, the description of the first embodiment related thereto will now be described herein. Explanation with specific numerical values will now be described referring to the photovoltaic power generation system 10 shown in FIG. 1. However, the numerical values described below are only examples, and may vary depending upon details of the photovoltaic power generation system 10 when implemented.

The photovoltaic power generation system 10 is assumed that 500 kW=0.5 MW is each rated output power of respective pairs of the photovoltaic cell arrays 1a to 1e and the PCs 2a to 2e. In this case, the whole system of the photovoltaic power generation system 10 is capable of generating power up to 2.5 MW. However, power generation at the maximum power output is not always performed because of circumstances such as power oversupply. The first embodiment is assumed that, as an example, an output power limit of 20% has been implemented. When the 20% output power limit is executed, even if the present maximum output as the whole system may be 2.5 MW, the main site controller 3 will give output power limits to the plurality of PCs 2a to 2e to reduce 20% of 2.5 MV so that the whole system generates 2.0 MW. At this time, output reduction in the plurality of PCs 2a to 2e may be performed uniformly, or the plurality of PCs 2a to 2e may be adjusted to output power different from each other. The first embodiment is assumed that the plurality of PCs 2a to 2e are adjusted to output different power from each other, and specifically the normal output control is performed under a condition in the following Table 1.

TABLE 1

| | Photovoltaic cell array 1e | Photovoltaic cell array 1d | Photovoltaic cell array 1c | Photovoltaic cell array 1b | Photovoltaic cell array 1a | Entire system |
|---|---|---|---|---|---|---|
| Photovoltaic cell array state | Equipment malfunction | Capacity remaining | Shade | Capacity remaining | Capacity remaining | Capacity remaining |
| PC output rate | 75% | 90% | 75% | 80% | 80% | 80% |
| Power generation amount | 0.375 MW | 0.45 MW | 0.375 MW | 0.40 MW | 0.40 MW | 2.0 MW |
| PC control contents | Normal output control (Third output control) | | | | | 20% output suppressing |

A photovoltaic cell array state is an individual state which each of the photovoltaic cell arrays 1a to 1e experiences. Each of the photovoltaic cell arrays 1a, 1b, and 1d is in "capacity remaining." The "capacity remaining" means that there is still enough room to increase a power generation amount. In contrast, the photovoltaic cell array 1c has small room to increase its power generation amount due to the shade 31 caused by the clouds 30. Also, the photovoltaic cell array 1e has small room to increase its power generation amount because some photovoltaic cell modules have malfunction.

A "PC output rate" is a value which corresponds to magnitude of each output power of the PCs 2a to 2e, and is expressed by a percentage when the rated output power is assumed to be output 100%. Referring to the PC 2a connected to the photovoltaic cell array 1a, the power generation amount is 0.40 MW which is 80% of the rated output power, while 100% of the rated output power is 500 kW=0.5 MW. Referring to a column of "entire system" shown at the rightest in Table 1, an average value of the PC output rate is 80%. That is, 20% output power limit is achieved.

Next, Table 2 illustrates an operation state when the first output control and the second output control is performed in the first embodiment. Table 2 illustrates a state when the first output control performs 30% decrease in the output power of the designated PC 2a, as an example. The second output control causes the remaining PCs 2b to 2e to generate plus 0.15 MW of power additionally for compensating the reduction (minus 0.15 MW) in the power output of the designated PC 2a.

TABLE 2

| | Photovoltaic cell array 1e | Photovoltaic cell array 1d | Photovoltaic cell array 1c | Photovoltaic cell array 1b | Photovoltaic cell array 1a | Entire system |
|---|---|---|---|---|---|---|
| Photovoltaic cell array state | Equipment malfunction | Capacity remaining | Shade | Capacity remaining | Efficiency measurement target | Capacity remaining |

TABLE 2-continued

| | Photovoltaic cell array 1e | Photovoltaic cell array 1d | Photovoltaic cell array 1c | Photovoltaic cell array 1b | Photovoltaic cell array 1a | Entire system |
|---|---|---|---|---|---|---|
| PC output rate | 80% (+5%) | 100% (+10%) | 80% (+5%) | 90% (+10%) | 50% (−30%) | 80% |
| Power generation amount | 0.40 MW | 0.50 MW | 0.40 MW | 0.45 MW | 0.25 MW | 2.0 MW |
| Power generation fluctuation amount | +0.025 MW | +0.05 MW | +0.025 MW | +0.05 MW | −0.15 MW | 0 |
| PC control contents | | Second output control | | | First output control (power generation amount reduction) | 20% output suppressing |

The first output control and the second output control according to the first embodiment are different from the normal output control according to the first embodiment in at least of the following points.

First difference is relationship between a total instructed power generation amount and output power control. If the total instructed power generation amount for the system is changed in the normal output control, the output power of each of the plurality of PCs 2a to 2e may be adjusted by the direction of the MSC. This adjustment is due to a change in the total instructed power generation amount, and is different from the second output control in the first embodiment. That is, in the first embodiment, the MSC 3 executes the first output control and the second output control in response to the measurement start signal S1, even when the total instructed power generation amount to the photovoltaic power generation system 10 has been changed or not, i.e. even when the total instructed power generation amount is constant.

Second difference is that the output power is changed to a plurality of values during a relatively short period of time. In the normal output control, each output power of the plurality of PCs 2a to 2e may be adjusted several times if there is a plurality of changes in the total instructed power generation amount within a certain period of time. However, in the normal output control, there is no designated PC 2a such that the output power thereof is intentionally changed to a plurality of different values within a time period during which the total instructed power generation amount is constant. By contrast, the first output control according to the first embodiment has a distinguished feature such that the output power of the designated PC 2a is actively adjusted to each of different predetermined output power amounts one by one in a certain time period during which the total instructed power generation amount is constant.

Third difference is the "alternation" of the designated PC 2a. Even if the normal output control performs adjustments of the output power of each of the plurality of PCs 2a to 2e due to a change in the total instructed power generation amount, the adjustments are temporary operations. In contrast, the first output control according to the first embodiment performs adjustments with respect to "designated PC", which is selected from the plurality of PCs 2a to 2e, to the predetermined output power amount, and the designated PC is alternated in a predetermined order. For example, the designated PC may be alternated in the order of PC 2a→PC 2b→PC 2e.

Fourth difference is directions in which each output power of the plurality of PCs 2a to 2e changes. When the normal output control performs adjustments of each output power of the plurality of PCs 2a to 2e due to a change in the total instructed power generation amount, it is common that each output power of the plurality of PCs 2a to 2e increases or decreases in the same tendency in accordance with an increase or decrease in the total instructed power generation amount. By contrast, the first output control and the second output control according to the first embodiment perform adjustments such that the power generation fluctuation amount of the designated PC 2a is compensated by the output power of the remaining PC 2b to 2e, and thereby each output power of the remaining PC 2b to 2e changes in the opposite direction to the designated PC 2a.

Figure 3:
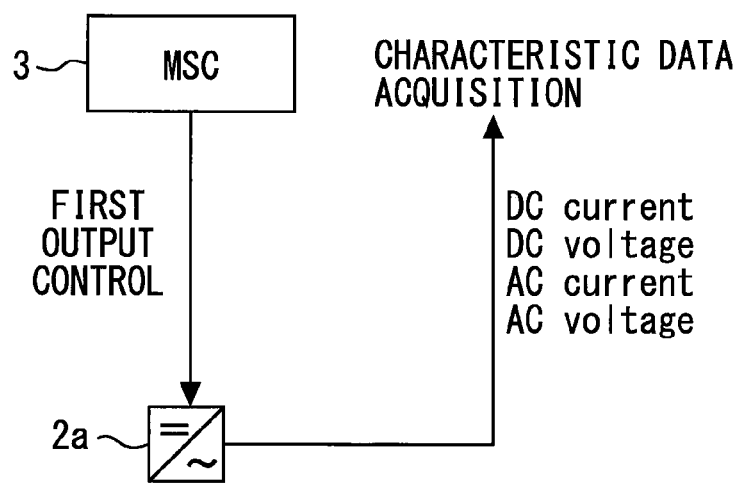
FIG. 3 is a block diagram for explaining characteristic-data acquisition in the photovoltaic power generation system according to the first embodiment of the present invention.

FIG. 3 is a block diagram for explaining the characteristic-data acquisition in the photovoltaic power generation system 10 according to the first embodiment of the present invention. The MSC 3 is configured to execute "characteristic-data acquisition". The "characteristic-data acquisition" is processing to acquire the input/output electrical characteristics of the designated PC 2a during the execution of the first output control. In the first embodiment, the characteristic-data acquisition is performed to acquire the input/output electrical characteristics of the designated PC 2a at four points which correspond to 25%, 50%, 75%, and 100% of the rated output power. The input/output electrical characteristics include input DC voltage, input DC current, output AC voltage, and output AC current. However, considering measurement errors in the ammeter 6 and the voltmeter 7, measurement data in small power generation amount may not be preferable for evaluation. Therefore, evaluation is preferably performed based on the input/output electrical characteristics at 10% of the output power or more.

The characteristic-data acquisition may be performed so that the input/output electrical characteristics measured by the ammeter 6 and voltmeter 7 are transmitted from the PC 2a to the MSC 3, and a storage medium in the MSC 3 stores the input/output electrical characteristics. Alternatively, as a modification, the designated PC 2a rather than the MSC 3 may be configured to execute the characteristic-data acquisition. That is, the characteristic-data acquisition may be performed so that a storage medium in the designated PC 2a stores the input/output electrical characteristics measured by the ammeter 6 and the voltmeter 7. Both the MSC 3 and the designated PC 2a may be configured to execute the characteristic-data acquisition. As described above, at least one of the MSC 3 and the designated PC 2a may perform the characteristic-data acquisition. The storage medium may be a flash memory or other readable recording medium, and may be a mass storage device such as a hard disk and an SDD.

Figure 4:
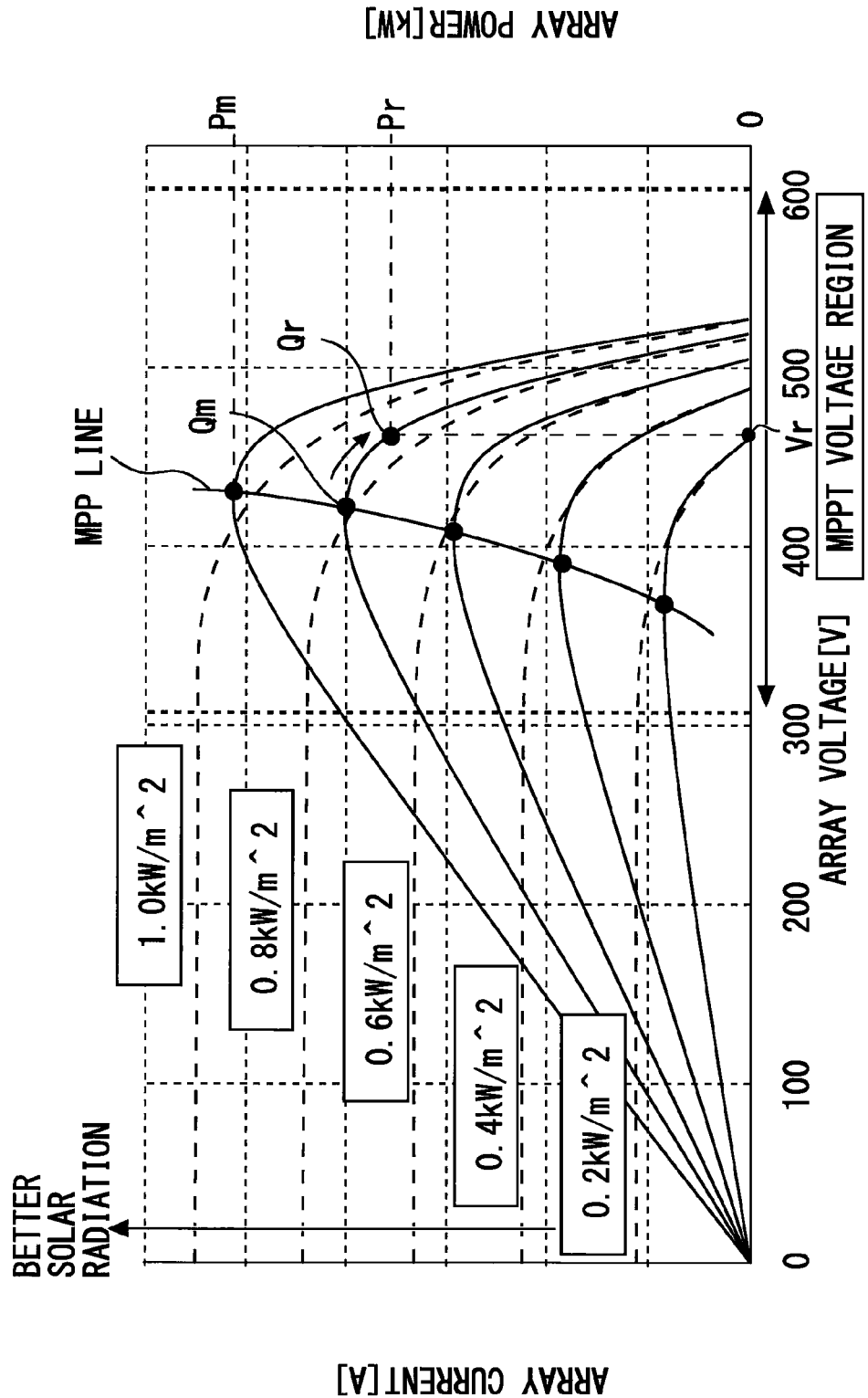
FIG. 4 is a diagram for explaining operation of the power conditioner in the photovoltaic power generation system according to the first embodiment of the present invention.
Figure 5:
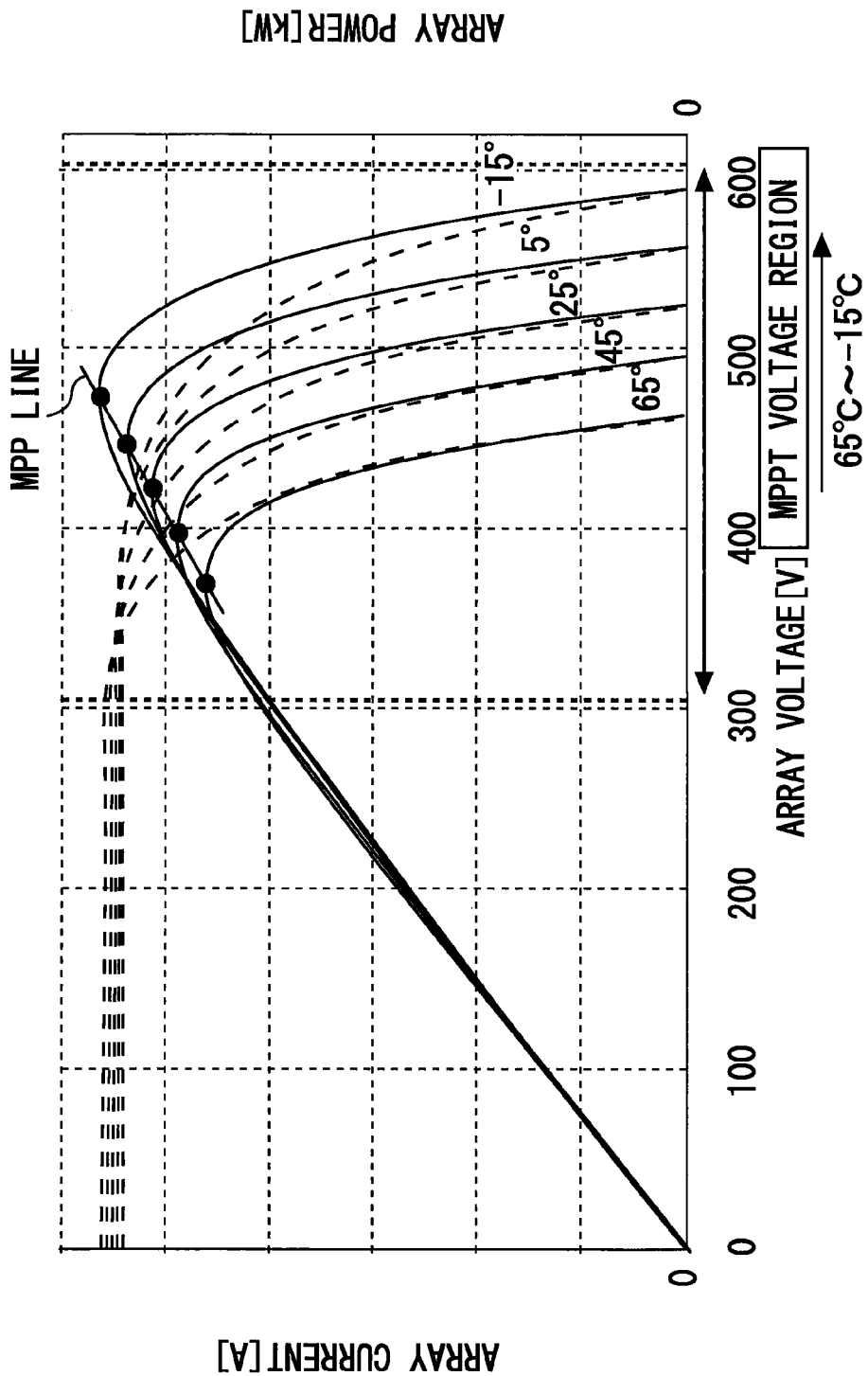
FIG. 5 is a diagram for explaining operation of the power conditioner in the photovoltaic power generation system according to the first embodiment of the present invention.

FIGS. 4 and 5 are diagrams for explaining operation of the PCs 2a to 2e in the photovoltaic power generation system 10 according to the first embodiment of the present invention. FIG. 4 is a diagram showing relationship of an I-V characteristic curve and a P-V characteristic curve according to solar radiation change. FIG. 5 is a diagram showing relationship of the I-V characteristic curve and the P-V characteristic curve according to temperature of a photovoltaic cell module.

The output power control of each of the plurality of PCs 2a to 2e is achieved by adjusting each operating point of the plurality of photovoltaic cell arrays 1a to 1e. The operating point adjustment is achieved by controlling the inverter circuit 5 in the plurality of PCs 2a to 2e, specifically by adjusting input impedance of the inverter circuit 5. Incidentally, the operating point adjustment has been a known technique as disclosed in a paragraph 0010 of JP-A-2000-3224, for example.

FIG. 4 illustrates a plurality of I-V characteristic curves and P-V characteristic curves with different amounts of solar radiation. In FIG. 4, each dashed line illustrates array current [A], and each solid line illustrates array power [kW]. When MPPT (Maximum Power Point Tracker) control is executed, each input impedance of the inverter circuits 5 in the plurality of PCs 2a to 2e is controlled so that each of the plurality of photovoltaic cell arrays 1a to 1 e generates power at one of operating points shown in a MPP line. For example, FIG. 4 includes a maximum generated power operating point Qm and an output suppressing control operating point Qr on the P-V characteristic curve in solar radiation of 0.8 kW/m². At the output suppression control operating point Qr, array power Pr is achieved by array voltage Vr and array current Ir. The array voltage Vr is an input DC voltage, and is a voltage of about 460V in FIG. 4. Input impedance control in the inverter circuit 5 changes the array voltage Vr and the array power Pr which are each input DC voltage and each output power of the plurality of PCs 2a to 2e. FIGS. 4 and 5 also illustrate a maximum rated output power Pm of each of the plurality of PCs 2a to 2e. By controlling the operating point, the first output control according to the first embodiment causes the array power Pr of the photovoltaic cell array 1a to be adjusted to each of four points: 25% of the rated output power of the designated PC 2a, 50% of the rated output power, 75% of the rated output power, and 100% of the rated output power.

The inverter circuit 5 in the designated PC 2a is controlled by the inverter control circuit 4. The inverter control circuit 4 executes voltage control so that actual output power of the inverter circuit 5 becomes equal to an output power target value which is one of control parameters. The inverter control circuit 4 achieves the "adjustment to the predetermined output power amount" by changing magnitude of the output power target value to the predetermined output power amount, and further maintaining the output power target value to the predetermined output power amount. By changing the output power target value to the predetermined output power amount, the operating point on the P-V curve in FIG. 4 is moved from the operating point Qm to the operating point Qr. By adjusting the output power target value to the predetermined output power amount, the designated PC 2a operates at the operating point Qr.

During the first output control, ideal control stably fixes to the operating point Qr an output power value, i.e. an operating point. However, during the first output control, the operation point may deviate in a very small range due to influence of disturbance or the like caused by a response delay of an actual feedback control. Even in such a case, if the output power target value remains unchanged after being changed to the predetermined output power amount, it is assumed that the "adjustment to the predetermined output power amount" according to the embodiment is still performed.

Figure 6:
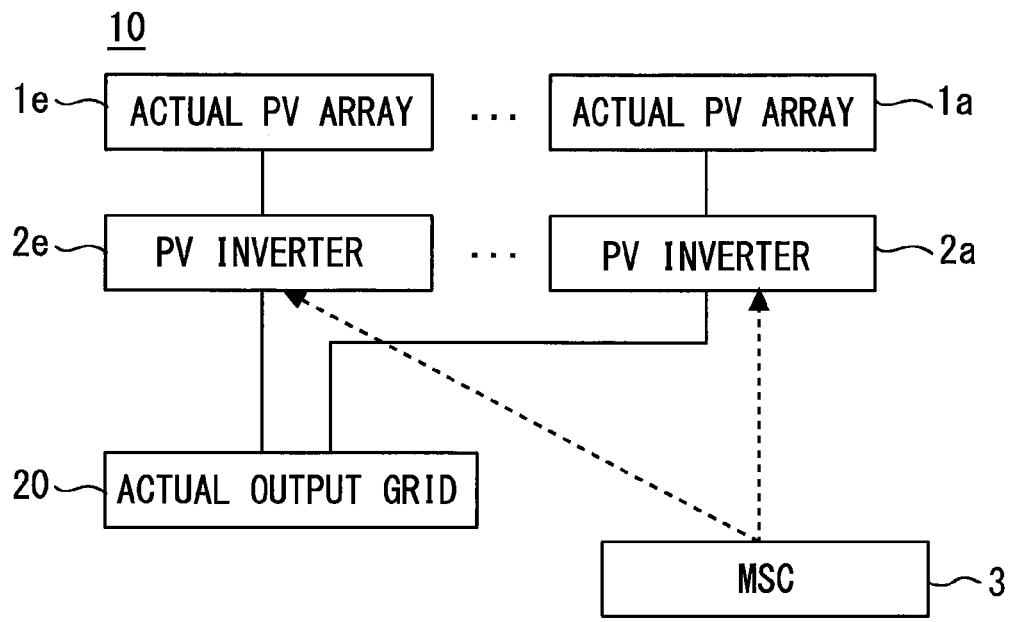
FIG. 6 is a block diagram for comparing an overview of the photovoltaic power generation system according to the first embodiment of the present invention with a comparative example.
Figure 7:
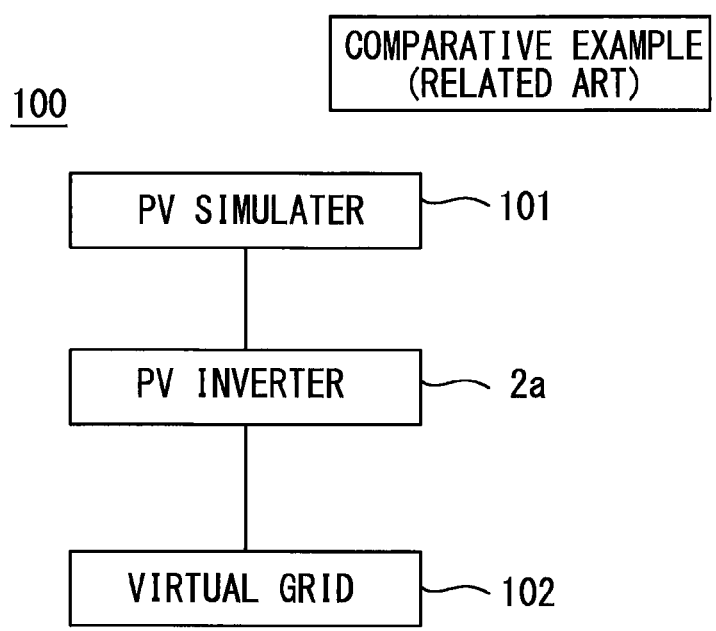
FIG. 7 is a block diagram showing an evaluation system according to a comparative example for the embodiment.

FIG. 6 is a block diagram for comparing an overview of the photovoltaic power generation system 10 according to the first embodiment of the present invention with a comparative example. FIG. 7 is a block diagram showing an evaluation system 100 according to a comparative example for the embodiment.

As shown in FIG. 7, it is also conceivable to measure reference conversion efficiency of the designated PC 2a using a photovoltaic cell simulator 101 and a virtual grid 102 under a predetermined reference measurement condition. However, each conversion efficiency of the plurality of PCs 2a to 2b is influenced by magnitude of each input DC voltage to the plurality of PCs 2a to 2b. The magnitude of the input DC voltage varies depending on condition such as a received solar radiation amount of photovoltaic cell modules included in the photovoltaic cell arrays 1a to 1e and temperature of the photovoltaic cell modules. Since natural environment changes from time to time, the input DC voltage is not perfectly constant in actual state of the photovoltaic power generation system 10. When condition such as input DC voltage varies, there is a problem that each actual conversion efficiency of the PCs 2a to 2e in the installed photovoltaic power generation system 10 cannot be correctly evaluated if evaluation is performed based on only the reference conversion efficiency measured by the simulator or the like.

On the other hand, in order to accurately record each actual conversion efficiency of the plurality of PCs 2a to 2b in the installed photovoltaic power generation system 10, ideally, it is also conceivable to build actually a photovoltaic power generation system for PC performance evaluation. However, if an actual photovoltaic power generation system is built only for the purpose of performance evaluation, there is a problem that it takes a large amount of labor. If the photovoltaic power generation system 10 planned to include the plurality of PCs 2a to 2b may be large in scale, it is not practical to actually construct such a large-scale system for performance assessment.

In this regard, according to the first embodiment, as shown in FIG. 6, the actual photovoltaic power generation system 10 achieves accurate measurements of each actual conversion efficiency of the plurality of PCs 2a to 2b in an actual natural environment. That is, according to the first embodiment, when the input/output electrical characteristic of the designated PC 2a is acquired by the first output control and the characteristic-data acquisition, the power generation fluctuation amount in the designated PC 2a can be compensated by the second output control in the remaining PCs 2b to 2e. This makes it possible to acquire the input/output electrical characteristic of the designated PC 2a in the actual photovoltaic power generation system 10 without deteriorating power generation performance of the photovoltaic power generation system 10. As a result, the designated PC 2a can be evaluated accurately based on the input/output electric characteristic under actual installation environments.

Preferably, the remaining PCs 2*b* to 2*e* can sufficiently compensate a power decrease amount or a power increase amount of the designated PC 2*a*. Therefore, the number of the "remaining PCs" is preferably sufficiently larger than the number of the "designated PC". In the first embodiment, the number of the remaining PCs 2*b* to 2*e* is four, which is sufficiently larger than the number of the designated PC 2*a*.

Figure 8:
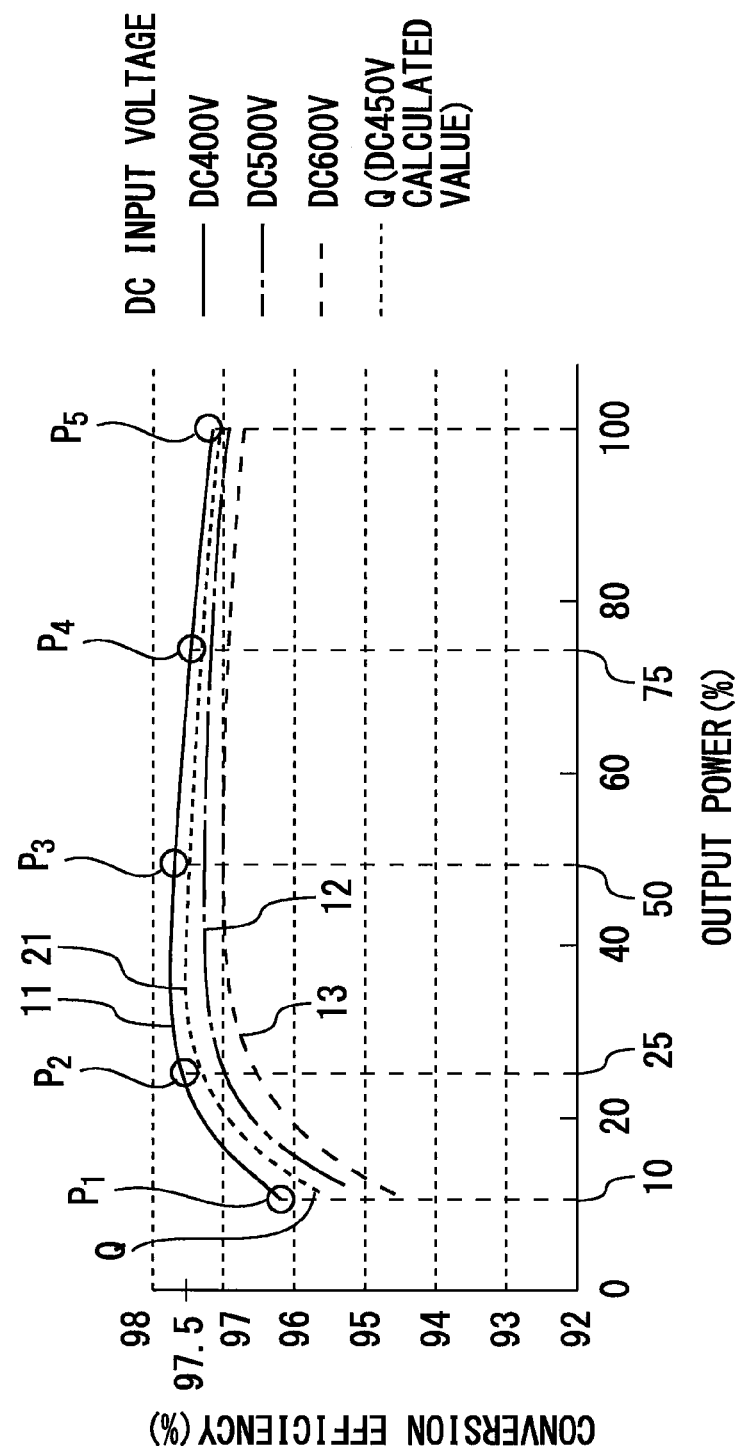
FIG. 8 is a graph recording conversion efficiency of the power conditioner in the photovoltaic power generation system according to the first embodiment of the present invention.
Figure 9:
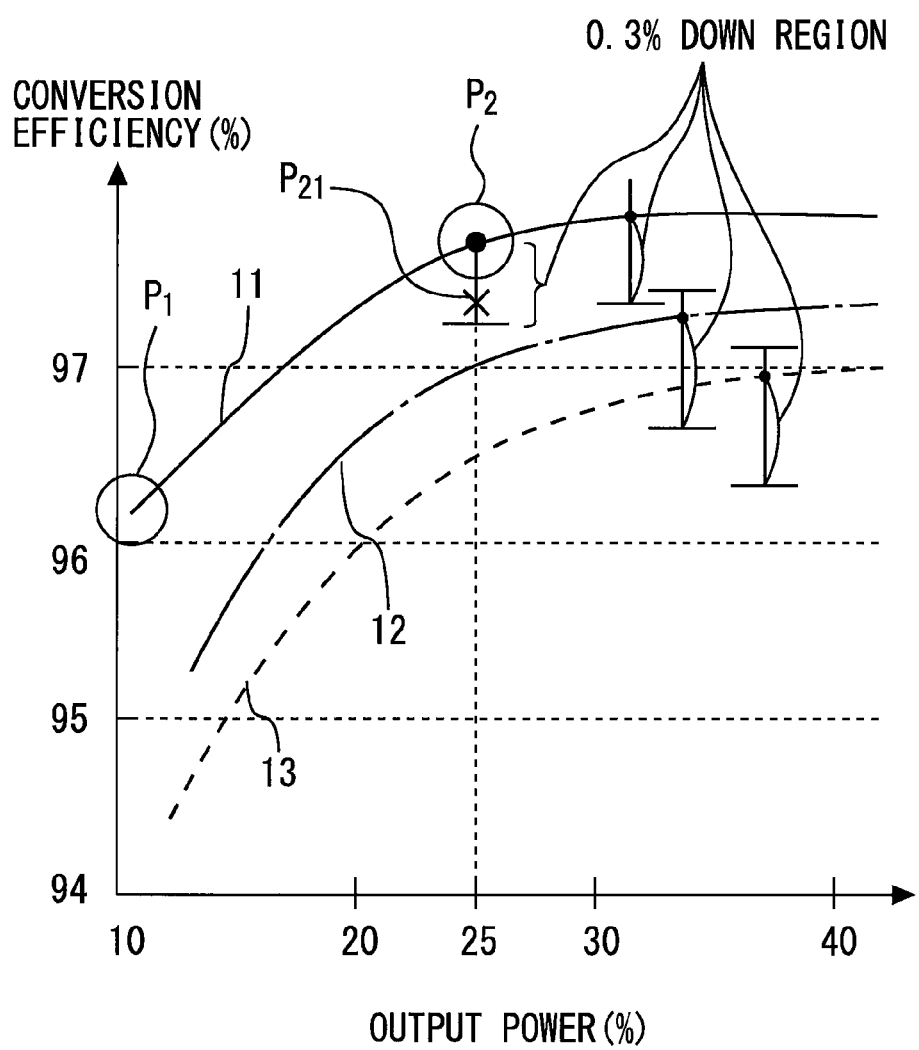
FIG. 9 is a partially enlarged view of the graph that records the conversion efficiency of the power conditioner in the photovoltaic power generation system according to the first embodiment of the present invention.

FIG. 8 is a graph of conversion efficiency of the PCs 2*a* to 2*e* in the photovoltaic power generation systems 10 in accordance with the first embodiment of the present invention, and FIG. 9 is a partially enlarged view thereof.

The input/output electrical characteristic includes the conversion efficiency. The conversion efficiency is determined based on a ratio of input DC power inputted to the designated PC 2*a* and output AC power of the designated PC 2*a* corresponding to the input DC power. That is, "conversion efficiency=AC output power/DC input power".

The MSC 3 stores a plurality of values of reference conversion efficiency in advance. The reference conversion efficiency defines a relationship between output power of a reference PC and conversion efficiency thereof when an input DC voltage to the reference PC is a particular DC voltage. This "reference PC" is a PC which is regarded as a criterion for evaluations, and has the same specifications as the plurality of PCs 2*a* to 2*e*.

The MSC 3 stores first reference conversion efficiency characteristic 11 shown by a solid line in FIG. 8, second reference conversion efficiency characteristic 12 shown by a chain line in FIG. 8, and third conversion efficiency characteristic 13 shown by a broken line in FIG. 8,. The "reference conversion efficiency characteristic" is a characteristic curve that defines relationship between output power and conversion efficiency. The first to third reference conversion efficiency characteristics 11 to 13 are reference conversion efficiency characteristics whose input DC voltages are DC400V, DC500V and DC600V. The first to third reference conversion efficiency characteristics 11 to 13 can be determined based on input and output of the "reference PC" at a design stage or an evaluation test stage of the plurality of PCs 2*a* to 2*e*.

Each of points P1 to P5 in FIG. 8 shows a value of conversion efficiency at each output power 10%, 25%, 50%, 75%, and 100% when the input DC voltage is DC400V. It should be noted that, for convenience, the following description may include expression of "η(efficiency@input DC voltage, output power)" in the meaning of a function of the input DC voltage and output power. For example, a conversion efficiency value at the point P1 is expressed as η(efficiency@400V, 10%).

The MSC 3 determines a difference between the first reference conversion efficiency characteristic 11 and actual conversion efficiency of the designated PC 2*a* obtained when input DC voltage thereof is a particular DC voltage, and determines whether or not the difference is within a predetermined range which is set in advance. Describing in detail with reference to FIG. 9, conversion efficiency P21 is calculated from data obtained when the input DC voltage is 400V in the designated PC 2*a*. The conversion efficiency P21 is compared with the conversion efficiency P2 in the first reference conversion efficiency characteristics 11 of the DC400V. Conversion efficiency of the designated PC 2*a* may be determined to be normal if a difference between the actually measured conversion efficiency P21 and the conversion efficiency P2 in the first reference conversion efficiency characteristics 11 of the DC400V is within a predetermined range. This makes it possible to accurately diagnose whether or not conversion efficiency is normal. The predetermined range can be defined as 0.3%, as an example.

The MSC 3 is configured to execute "reference conversion efficiency calculation". When the input DC voltage is any voltage between the DC400V and the DC500V, or any voltage between the DC500V and the DC600V, data in FIG. 8 does not include a characteristic whose input DC voltage accurately coincides thereto. In such a case, the reference conversion efficiency calculation based on the following equation (1) calculates a reference conversion efficiency characteristic for an intermediate input DC voltage.

$$\eta(\text{efficiency}@420V, 70\%) = \eta(\text{efficiency}@400V, 70\%) \times k1 + \eta(\text{efficiency}@500V, 70\%) \times k2 \quad (1)$$

Wherein, k1 and k2 are as follows: k1=0.8 and k2=0.2.

Equation (1) is a mathematical expression for obtaining the intermediate value of the conversion efficiency by proportional distribution. The η(efficiency@420V, 70%) is conversion efficiency when the input DC voltage is DC420V and the output power is 70%. The η(efficiency@400V, 70%) is conversion efficiency when the input DC voltage is DC400V, that is the input DC voltage is on the first reference conversion efficiency characteristic 11, and the output power is 70%. The η(efficiency@500V, 70%) is conversion efficiency when the input DC voltage is DC500V, that is the input DC voltage is on the second reference conversion efficiency characteristic 12, and the output power is 70%. First, based on a proportional distribution method, calculation is performed to obtain the first coefficient k1 corresponding to a difference between 400V and 420V and the second coefficient k2 corresponding to a difference between 500V and 420V. Next, a value of a first term on the right-hand side of Equation (1) is obtained by multiplying η(efficiency@400V, 70%) by the first coefficient (k1=0.8). Thereafter, a value of a second term on the right-hand side of Equation (1) is obtained by multiplying η(efficiency@500V, 70%) by the second coefficient (k2=0.2).

Dotted line Q in FIG. 8 (DC450V calculated value) is a specific example of a characteristic curve obtained by the calculation of Equation (1). The characteristic curve of the dotted line Q illustrates values of calculated conversion efficiency with respect to the output power from 10% to 100% when the input DC voltage is DC450V. When the input DC voltage is DC450V, the first coefficient and the second coefficient may be 0.5 based on the proportional distribution. As exemplified by the dotted line Q, obtaining intermediate conversion efficiency by the reference conversion efficiency calculation makes it possible to perform accurate conversion efficiency diagnostic while suppressing an amount of stored data of reference conversion efficiency.

Figure 10:
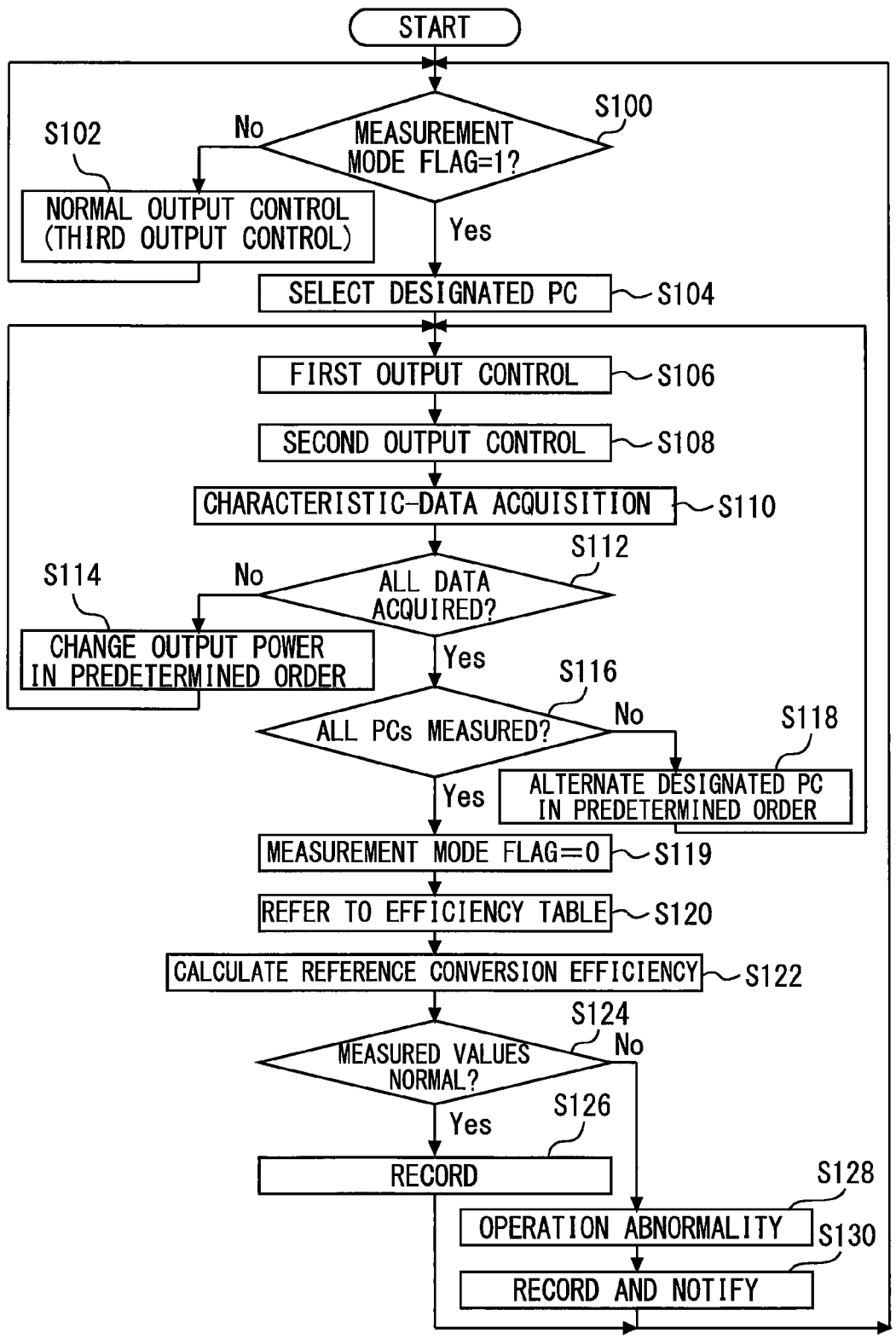
FIG. 10 is a flowchart illustrating a routine executed in the photovoltaic power generation system according to the first embodiment of the present invention.

FIG. 10 is a flowchart illustrating a routine executed in the photovoltaic power generation system 10 according to the first embodiment of the present invention. The routine of FIG. 10 is stored in the memory of the MSC 3 in a form of a program in advance.

In the routines of FIG. 10, first, the MSC 3 determines whether or not there is an instruction to start measurement (step S100). When the MSC 3 receives the measurement start signal S1, "1" is set to a measurement mode flag in the program of the MSC 3. By setting "1" into the measurement mode flag, a determination result in step S100 becomes "Yes". As long as the determination result in step S100 is "No", the MSC 3 executes the normal output control i.e. the third output control.

When the determination result is "Yes" in step S100, the MSC 3 executes "selection of a designated PC" (step S104). In the first embodiment, the MSC 3 is assumed to select the PC 2a as the first designated PC each time. However, the method of selecting the designated PC is not limited thereto. As a modification, for example, random selection may be performed from the plurality of PCs 2a to 2e using a pseudo-random number or the like. Alternatively, a PC with the lowest or highest output power at the time of receiving the measurement start signal S1 may be selected as the designated PC. Alternatively, a PC having output power closest to an average output value at the time of receiving the measurement start signal S1 may be selected as the designated PC.

Next, the MSC 3 executes the first output control for the designated PC 2a selected in step S104 (step S106). The predetermined output power amount in the first output control, as described above, includes a plurality of output power values. Therefore, the first output control adjusts the output power of the designated PC 2a to 25%, 50%, 75%, and 100% of the rated output power in a predetermined order. The predetermined order may be defined to reduce sequentially from 100% to 25%, or may be defined to increase sequentially from 25% to 100% conversely. The first embodiment is assumed that the predetermined output power amount is first set to 100%, and then is sequentially lowered from 100%. That is, in the first step S106 in the present routines, the predetermined output power amount is 100%.

It should be noted that, due to influence such as a small amount of solar radiation or a high temperature of the photovoltaic cell module, the solar power generation system 10 may not be able to generate the same output as the rated output power even if the MPPT control is executed. In such cases, it is not possible to adjust the output power to 100%, and therefore the MSC 3 may skip adjustment to 100% so as to execute adjustment to the predetermined output power amount of 75% or less. Alternatively, the MSC 3 may execute adjustment of the output power to an achievable output power amount at this time which is closest to the rated output power, and may record the adjusted value of the output power.

Next, the MSC 3 executes the second power control (step S108). In step S108, the MSC 3 calculates an increased power generation amount which is caused by step S106's control of increasing the output power of the designated PC 2a to the predetermined output power amount. This time, it is assumed that an increased amount caused by increasing up to 100% is calculated. The MSC 3 reduces each output power of the remaining PCs 2b to 2e so that the output power reduction in the remaining PCs 2b to 2e cancels out the increased power generation amount.

When sharing the power generation fluctuation amount, the second output control of step S108 executes different sharing methods in accordance of output power increasing or output power decreasing in the designated PC 2a. In other words, a wording of "sharing" includes "sharing of a positive power generation amount" and "sharing of a negative power generation amount". The "sharing of a positive power generation amount" is conducted to increase the output power of the remaining PCs 2b to 2e to compensate a power generation reduction amount of the designated PC 2a. The "sharing of a minus power generation amount" is conducted to reduce the output power of the remaining PCs 2b to 2e in order to compensate an increased generation amount of the designated PC 2a. When the first output control is executed to increase the output power of the designated PC 2a, following manner may be used. As an example, output power of all of the remaining PCs 2b to 2e may be reduced little by little to cancel out an increased power generation amount of the designated PC 2a, and the output power of all of the remaining PCs 2b to 2e may be reduced on average. As another example, output power of some of the remaining PCs 2b to 2e may be reduced so as to cancel out an increased power generation amount of the designated PC 2a, and output power of the rests of the remaining PC 2b to 2e may be maintained. Output power reduction in the designated PC 2a can also be performed in the same manner as in these examples.

Then, the MSC 3 executes the characteristic-data acquisition (step S110). In this step, as described with reference to FIG. 3, the MSC 3 acquires the input/output electrical characteristics of the designated PC 2a during a period in which the first output control of step S106 is being executed. Acquired values of the input/output electrical characteristics are stored in the memory of the MSC 3 in a state where the acquired values are associated with the output power value and the input DC voltage value of the designated PC 2a at the time of acquisition.

Next, the MSC 3 determines whether or not the characteristic-data acquisition is completed for all of the plurality of predetermined output power amounts being set in advance (step S112). In the first step S106 of the present routine, the MSC 3 only executes the characteristic-data acquisition when the predetermined output power amount=100%. Therefore, at this stage, step S112 results in "No".

When step S112 results in "No", the MSC 3 changes a value of the predetermined output power amount in a predetermined order being set in advance (step S114). In the first embodiment, the predetermined output power amount is sequentially decreased from 100%, and therefore the predetermined output power amount is set to 75%. Thereby, the value of the predetermined output power amount is updated.

Subsequently, the process returns to step S106. In step S106 again after returning from step S114, the MSC 3 executes the first output control for adjustment to the updated predetermined output power amount=75%. In response thereto, the MSC 3 executes the second power control in step S108. As a result, each output power of the remaining PCs 2b to 2e is adjusted in an increasing direction so as to cancel out the decreased power generation amount caused by the adjustment to the predetermined output power amount=75%. Subsequently, in step S110, the MSC 3 executes the characteristic-data acquisition during execution of the first output control at the predetermined output power amount=75%. Thereafter, by a processing loop through steps S112 and S114, similar processing is also executed for predetermined output power amounts=50% and 25%. After the last characteristic-data acquisition at the output power of 25% is completed, the processing result of the subsequent step S112 becomes "Yes".

Next, the MSC 3 determines whether or not measurement is completed for all of the PCs 2a to 2e (step S116). In the first step S116 in the present routine, the PC 2a only has been selected as the designated PC. Therefore, the determination result of step S116 becomes "No", and the processing proceeds to step S118.

In step S118, the MSC 3 alternates the designated PC in a predetermined order which is set in advance. The first embodiment is assumed that the MSC 3 selects the designated PC in the order of PC 2a→2b→2c→2d→2e, as an example. Therefore, in the first step S118 in the present routine, the MSC 3 selects the PC 2b as the designated PC. Thereafter, the processing returns to step S106.

When the processing returns from step S118 to step S106, the MSC 3 executes the processing of steps S106 to S114 with respect to the designated PC 2b after the alternation and the remaining PC 2a, 2c to 2e after the further alternation in the same way as the designated PC 2a before the alternation. As a result, the MSC 3 can also executes with respect to the designated PC 2b the first output control for adjusting to each of predetermined output power amounts=100%, 75%, 50% and 25%, and can execute each characteristic-data acquisition of these predetermined output power amount. Further, the MSC 3 can also executes the second power control with respect to the remaining PCs 2a, 2c to 2e other than the designated PC 2b. Thereafter, the MSC 3 similarly alternates the designated PC in the order of the designated PC 2c→2d→2e to perform a series of processing of steps S106 to S114 for all of the plurality of predetermined output power amounts for all of the PCs 2a to 2e. After completing the last characteristic-data acquisition for the last designated PC 2e, the determination result becomes "Yes" in both step S112 and step S116. If the determination result is "Yes" in step S116, the MSC 3 sets "0" to the measurement mode flag, and thereafter processing proceeds to next step (step S119). Thereby, the measurement required in step S100 is completed.

Next, the MSC 3 refers to an efficiency table (step S120). The efficiency table is a table which stores the first to third reference conversion efficiency characteristics 11 to 13 shown in FIGS. 8 and 9. The MSC 3 stores this table in the internal memory and reads it in step S120.

Then, the MSC 3 executes a "reference conversion efficiency calculation program" (Step S122). In step S122, the MSC 3 has already stored the values of a large number of input/output electrical characteristics acquired by the characteristic-data acquisition. The following Table 3 is a table which summarizes acquired data by the MSC 3 for each of the PCs 2a to 2e and calculated data in step S122 and step S124. "Actual conversion efficiency" is a value obtained by substituting the input/output electrical characteristic values actually obtained by the above-described step S110 into a calculation expression of "conversion efficiency=AC output power/DC input power". At the time of step S122, the MSC 3 stores data of the PCs 2a to 2e which includes the input DC voltage $V_{DCa25}$ to $V_{DCe100}$ (V) and the actual conversion efficiency $\eta_{ma25}$ to $\eta_{me100}$ corresponding to each output power 25% to 100%. Reference conversion efficiency (calculated value), efficiency difference, and normal/abnormal flag are data calculated in step S122 and step S124.

In step S122, the MSC 3 calculates the reference conversion efficiency $\eta_{refa1}$ to $\eta_{refe4}$ using the efficiency table of FIG. 8 referred in step S120 and the expression (1) described above. For example, it is supposed that input DC voltage $VD_{Ca75}$ at which actual conversion efficiency $\eta_{ma75}$ has been obtained does not take a value of exactly 400V, 500V, or 600V. In this case, a value of $\eta_{ma75}$ cannot be directly compared with the reference conversion efficiency characteristics stored in the efficiency table of FIG. 8. Therefore, MSC 3 executes the reference conversion efficiency calculation program to obtain the reference conversion efficiency $\eta_{refa3}$ to be compared with $\eta_{ma75}$ as follows.

The reference conversion efficiency calculation program executes different processing when the value of the input DC voltage is different. If 400(V)<$V_{DCa75}$(V)<500(V), calculations are performed according to the following formula (2). Here, an example is described in a case where $V_{DCa75}$=421V.

$$\eta_{refa3}=\eta(\text{efficiency}@V_{DCa75},75\%)=\eta(\text{efficiency}@400V,75\%) \times k1+\eta(\text{efficiency}@500V,75\%) \times k2 \quad (2)$$

k1=(500−$V_{DCa75}$)/(500−400)=(500−421)/100=0.79
k2=($V_{DCa75}$−400)/(500−400)=(421−400)/100=0.21

If 500 (V)<$V_{DCa75}$(V)<600(V), calculation is performed according to the following formula (3).

$$\eta_{refa3}=\eta(\text{efficiency}@V_{DCa75},75\%)=\eta(\text{efficiency}@500V,75\%) \times k1+\eta(\text{efficiency}@600V,75\%) \times k2 \quad (3)$$

Wherein, k1 and k2 are as follows.
k1=(600−$V_{DCa75}$)/(600−500)
k2=($V_{DCa75a}$−500)/(600−500)

Since calculation contents of step S122 has already been described with reference to FIGS. 8 and 9, the further detailed description will be omitted here.

Next, the MSC 3 determines whether or not measured values are normal (step S124). Step S124 calculates each difference value between each actual conversion efficiency $\eta_{ma25}$ to $\eta_{me100}$ and each reference conversion efficiency $\eta_{refa1}$ to $\eta_{refe4}$. The first embodiment uses a predetermined range of conversion efficiency as a determination criterion to determine normal or abnormal, and the range is set to 0.3%. Therefore, all errors not exceeding 0.3% down range is determined to be normal, and then a normal flag is set. In above Table 3, since efficiency difference at output power 50% in the PC 2b exceeds 0.3%, only one abnormal flag thereof is set among the plurality values of conversion efficiency. It should be noted that an abnormal flag may be set when the actual conversion efficiency is 0.3% or more

TABLE 3

|  | Output power (%) | Input DC voltage (V) | Actual conversion efficiency (%) | Reference conversion efficiency - calculation value (%) | Efficiency difference (%) | Normal/abnormal flag |
|---|---|---|---|---|---|---|
| PC 2a | 25% | $V_{DCa25}$ | $\eta_{ma25}$ | $\eta_{refa1}$ | 0.1% | Normal |
|  | 50% | $V_{DCa50}$ | $\eta_{ma50}$ | $\eta_{refa2}$ | 0.2% | Normal |
|  | 75% | $V_{DCa75}$ | $\eta_{ma75}$ | $\eta_{refa3}$ | 0.1% | Normal |
|  | 100% | $V_{DCa100}$ | $\eta_{ma100}$ | $\eta_{refa4}$ | 0.2% | Normal |
| PC 2b | 25% | $V_{DCb25}$ | $\eta_{mb25}$ | $\eta_{refb1}$ | 0.2% | Normal |
|  | 50% | $V_{DCb50}$ | $\eta_{mb50}$ | $\eta_{refb2}$ | 0.32% | Abnormal |
|  | ... | ... | ... | ... | ... | ... |
|  | 100% | $V_{DCb100}$ | $\eta_{mb100}$ | $\eta_{refb4}$ | 0.1% | Normal |
| ... | ... | ... | ... | ... | ... | ... |
| PC 2e | 25% | $V_{DCe25}$ | $\eta_{me25}$ | $\eta_{refe1}$ | 0.1% | Normal |
|  | ... | ... | ... | ... | ... | ... |
|  | 100% | $V_{DCe100}$ | $\eta_{me100}$ | $\eta_{refe4}$ | 0.2% | Normal | larger than the reference conversion efficiency. Further, the predetermined range used as an abnormality criterion is not limited to 0.3% of the reference conversion efficiency. For example a value smaller than 0.3% such as 0.1% may be used, for example, or a value greater than 0.3% such as 0.5% may be used, and it is preferable that the value can be set to any value. The value may not have to be a fixed value, or adjustments thereto may be applied as necessary after the installation of the photovoltaic power generation system.

If at least one abnormal flag is set in step S124, determination result in step S124 is "No". Thereafter, processing proceeds to step S128, the MSC 3 stores a determination history of an operational abnormality in the photovoltaic power generation system 10 (step S128), and the MSC 3 records and notifies occurrence of abnormality (step S130). Thereafter, processing returns to step S100.

If no abnormality is found in step S124, that is, when all normal flags are set in Table 3, determination result in step S124 becomes "Yes". In this event, the MSC 3 records that the present measurements have no abnormality (step S126). Thereafter, processing returns to step S100.

After processing returns to step S100, if the MSC 3 receives the measurement start signal S1 again, the series of processing described above is executed again.

According to the detailed processing described above, the MSC 3 makes it possible to perform the characteristic-data acquisition (step S110) in a plurality of times while varying the output power of the designated PC 2a in step S106 and S114. A plurality of input/output characteristics can be continuously acquired for one designated PC 2a. The output power may be maintained to each predetermined output power amount during a corresponding predetermined unit measurement time. This makes it possible to reliably measure individual input/output characteristic.

According to steps S116 and S118 in the above detailed processing, the MSC 3 is configured to alternate the "designated PC" in the predetermined order among the plurality of PCs 2a to 2e. It is possible to smoothly execute the characteristic data acquisition of the plurality of PCs 2a to 2e by alternating the designated PC 2a to one of the remaining PCs 2b to 2e, and then further alternating the second designated PC to another PC in order.

With steps S112 and S114 in the routine in FIG. 10, the MSC 3 is configured to execute the characteristic-data acquisition (step S110) for obtaining one input/output electrical characteristic and, thereafter, to adjust the output power of the designated PC 2a to another predetermined output power amount while the designated PC 2a is kept to be selected. Specifically, first, the predetermined output power amount can become the plurality of predetermined output power amounts (25% to 100%). The first output control (step S106) adjusts the output of the designated PC 2a to each predetermined output power amount via a processing loop of steps S112 and S114. In response thereto, the characteristic-data acquisition of step S110 acquires input/output electrical characteristics of the designated PC 2a for each predetermined output power amount. The MSC 3 alternates the designated PC 2a to another PC in a predetermined order after the characteristic-data acquisition to the designated PC 2a is completed for each of the predetermined output power amounts. According to such a series of operations, each time all of the plurality of input/output characteristics are continuously acquired for one designated PC 2a, and then the designated PC 2a can be alternated to a second designated PC.

The MSC 3 may calculate a shared power generation amount in step S108. The shared power generation amount is the rest of power generation amount calculated by subtracting from the total instructed power generation amount P0 the predetermined output power amount to which the output of the designated PC 2a should be adjusted. The second output control causes the remaining PCs 2b to 2e to share the shared power generation amount during the execution of the first output control. This makes it possible to reliably compensate the amount of power generation required for the photovoltaic power generation system 10 since the second output control can be executed while accurately identifying the amount of the shared power generation amount which should be shared by the remaining PCs 2b to 2e.

According to the detailed processing as described above, the MSC 3 executes the first output control and the second output control in response to the measurement start signal S1 in step S100. The MSC 3 executes a processing loop of steps S104 to S118 to alternate the designated PC 2a to the second PC and the subsequent PC in a predetermined order so that the first output control is performed for each of the plurality of PCs 2a to 2e, while the MSC 3 executes the second output control for "the remaining PCs other than the designated PC" in parallel with the alternation. After completing each characteristic-data acquisition to the plurality of PCs 2a to 2e in step S116, the MSC 3 executes processing of steps S120 to S130 and thereafter restarts the normal output control in step S102. Thereafter, until the next measurement start signal S1 is received, the normal output control is continued. This makes it possible to quickly perform the characteristic-data acquisition for the plurality of PCs 2a to 2e without preventing normal power generation of the photovoltaic power generation system 10 as much as possible.

Processing is preferably conducted in relatively short time to execute a series of processing of the first output control in step S106, the second output control in step S106, and the characteristic-data acquisition in step S110. The first output control and the second output control may be configured to execute output power adjustment only during a predetermined adjustment time being set in advance. The predetermined adjustment time may be a time length more than about several tens of seconds and less than one minute, or may be a time length more than one minute and less than ten minutes. The reasons for such a short time are as follows. From a viewpoint of suppressing fluctuations in the natural environmental conditions at the time of the characteristic-data acquisition, small variation in solar radiation amount and small variation in temperature are preferable during a time period from a start of measurement in the routine of FIG. 10 to the end of all characteristic measurements by the characteristic-data acquisition in step S112. Furthermore, small variation in solar radiation amount and small variation in temperature are preferable during a period from a start of measurement to the end of all the characteristic-data acquisition for all the PCs 2a to 2e.

In the first embodiment, the MSC 3 corresponds to the "high order device" in the above-described "Summary".

Figure 17:
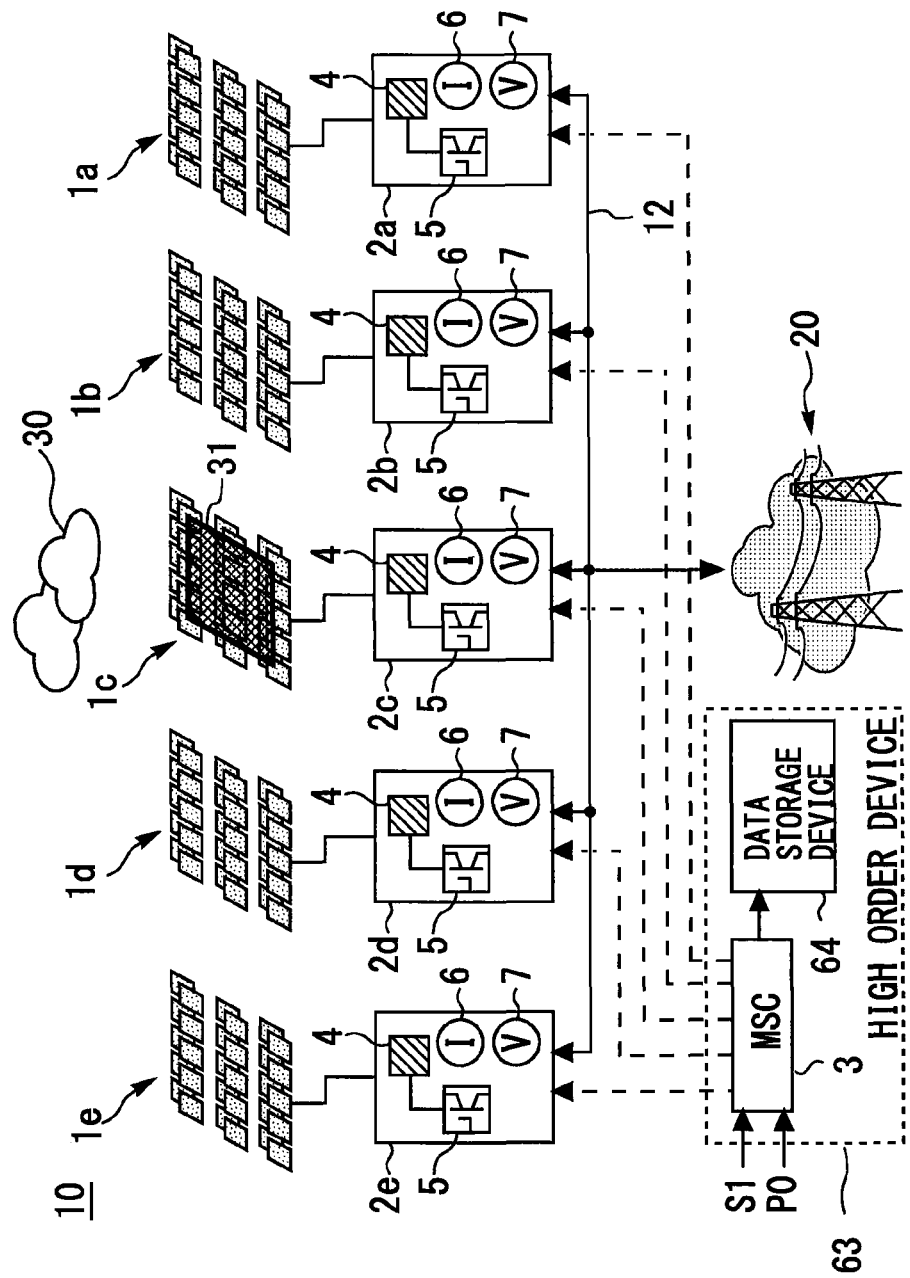
FIG. 17 is a block diagram illustrating a photovoltaic power generation system according to a modification of the first embodiment of the present invention.

FIG. 17 is a block diagram showing the photovoltaic power generation system 10 according to a modification of the first embodiment of the present invention. In first embodiment, the MSC 3 performs both control and data acquisition. On the other hand, as illustrated in FIG. 17 as a modification, a high order device 63 may be configured to include the MSC 3 and a data storage device 64 such as a data logger. In this case, the MSC 3 is in charge of control and the data storage device 64 is in charge of data acquisition. In the modification of FIG. 17, the high order device 63 corresponds to the "high order device" in the above-described "Summary".

Second Embodiment.

A photovoltaic power generation system 110 according to the second embodiment has some components in common with the first embodiment in system configuration, etc. On the other hand, difference between the first embodiment and the second embodiment is that the MSC 3 or the high order device 63 is omitted, and that the PC 2d is used as a "master power conditioner" to execute the first output control and the second output control, and the like. The following description will be carried out with reference to the same reference numerals for the same or corresponding configuration as in the first embodiment, the differences between the first embodiment and the second embodiment will be mainly described, and common matters therebetween will be simplified or omitted.

Figure 11:
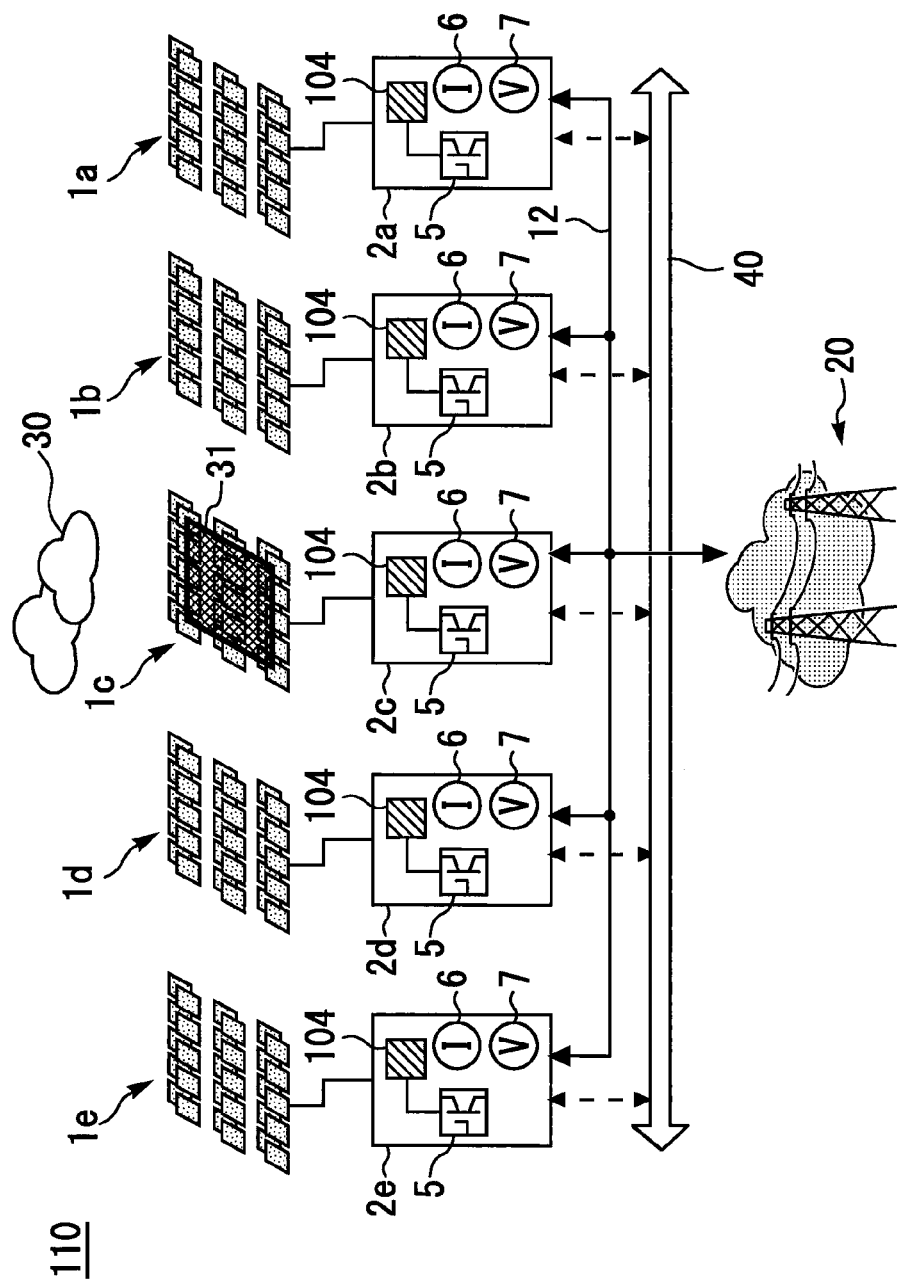
FIG. 11 is a schematic diagram illustrating a photovoltaic power generation system according to a second embodiment of the present invention.
Figure 12:
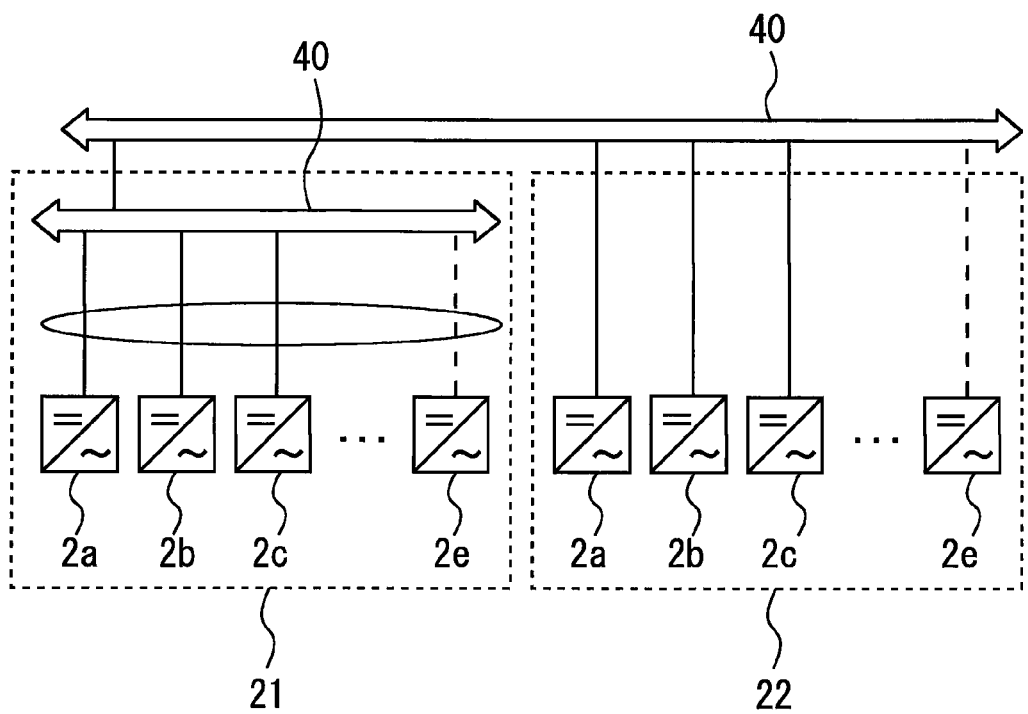
FIG. 12 is a block diagram illustrating connection relationship of power conditioners in the photovoltaic power generation system according to the second embodiment of the present invention.

FIG. 11 is a schematic diagram showing the photovoltaic power generation system 110 according to the second embodiment of the present invention. FIG. 12 is a block diagram illustrating connection relationship of PCs 2a to 2e in the photovoltaic power generation system 110 according to the second embodiment of the present invention. When the first and second embodiments are compared, FIG. 11 corresponds to FIG. 1, and FIG. 12 corresponds to FIG. 2. Unlike the first embodiment, the MSC 3 is not provided in the second embodiment. Instead thereof, the plurality of PCs 2a to 2e are communicatively connected to each other via a network system 40. The network system 40 may be configured by a wired network or may be configured by a wireless network. In the second embodiment, the plurality of PCs 2a to 2e includes a "master PC" and a "slave PC". In the following explanation, as an example, the PC 2d is assumed to be a master PC, and the PCs 2a to 2c, 2e are assumed to be slave PCs.

In the photovoltaic power generation system 110 according to the second embodiment, a control microcomputer 104 in the master PC 2d is configured to execute the first output control, the second output control, and the characteristic-data acquisition as described in the first embodiment.

Further, in the second embodiment, as a preferred embodiment, the photovoltaic power generation system 110 is constructed so that each pf the plurality of PCs 2a to 2e executes "redundancy control". Each control microcomputer in the plurality of PCs 2a to 2e stores a redundancy control program for executing the redundancy control, and also stores an executable program group of the first output control, the second output control, and the characteristic-data acquisition.

Figure 13:
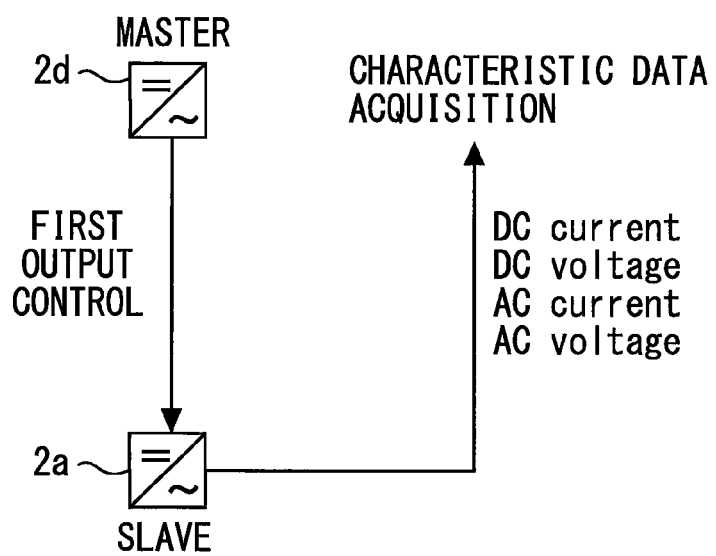
FIG. 13 is a block diagram explaining characteristic-data acquisition of the photovoltaic power generation system according to the second embodiment of the present invention.

FIG. 13 is a block diagram for explaining the characteristic-data acquisition of the photovoltaic power generation system 110 according to the second embodiment of the present invention. In the second embodiment, the master PC 2d can perform the characteristic-data acquisition with respect to the slave PCs 2a to 2c, 2e in the same manner as in the MSC 3 of the first embodiment. It should be noted that, in the first embodiment and modifications thereof, it has been described that at least one of the MSC 3 and the designated PC 2a is configured to execute the characteristic-data acquisition. In the second embodiment, at least one of the master PC 2d and the plurality of slave PCs 2a to 2c, 2e may also be configured to execute the characteristic-data acquisition.

Since the second embodiment substitute the MSC 3 and the high order device 63 for the master PC 2d, the MSC 3 and the high order device 63 can be omitted. It should be noted that, both the master PC 2d and the slave PCs 2a to 2c, 2e may be selected as the "designated PC". In other words, the master PC 2d itself may also be a target of the first output control and the second output control. The master PC 2d can execute the first output control and the characteristic-data acquisition to itself and can execute the second output control to itself, as necessary.

Figure 14:
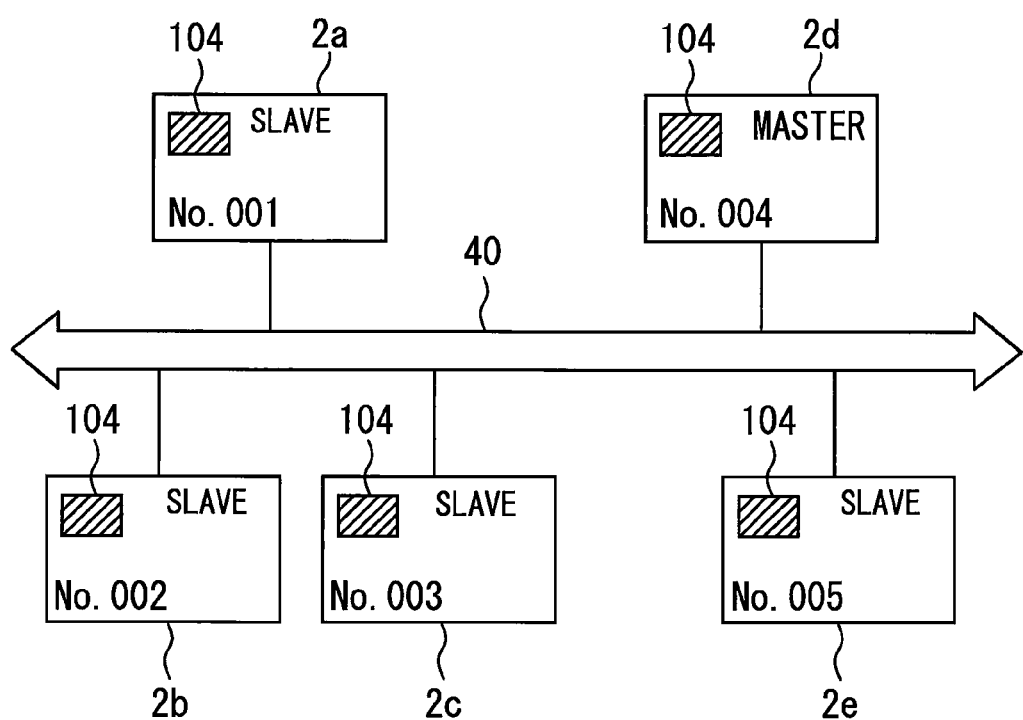
FIG. 14 is a block diagram illustrating a network of power conditioners in the photovoltaic power generation system according to the second embodiment of the present invention.

FIG. 14 is a block diagram illustrating the network of the PCs 2a to 2e in the photovoltaic power generation system 110 according to the second embodiment of the present invention. The plurality of PCs 2a to 2e are constructed to perform the redundancy control. The redundancy control is a control to select a new master PC from a plurality of slave PCs when the current master PC malfunctions or the like. Unique network addresses No.001 to 005 are allocated to the plurality of PCs 2a to 2e. A control entity for executing the redundancy control is each control microcomputer 104 in the plurality of PCs 2a to 2e. The control microcomputer 104 is programmed to have contents of the redundancy control. In various technical fields such as computer networks, redundancy control techniques are known. By applying this redundancy control technique to the PC 2a to 2e, it is possible to maintain the photovoltaic power generation system 110 by using another slave PC as a new master PC even if the master PC malfunctions.

Figure 15:
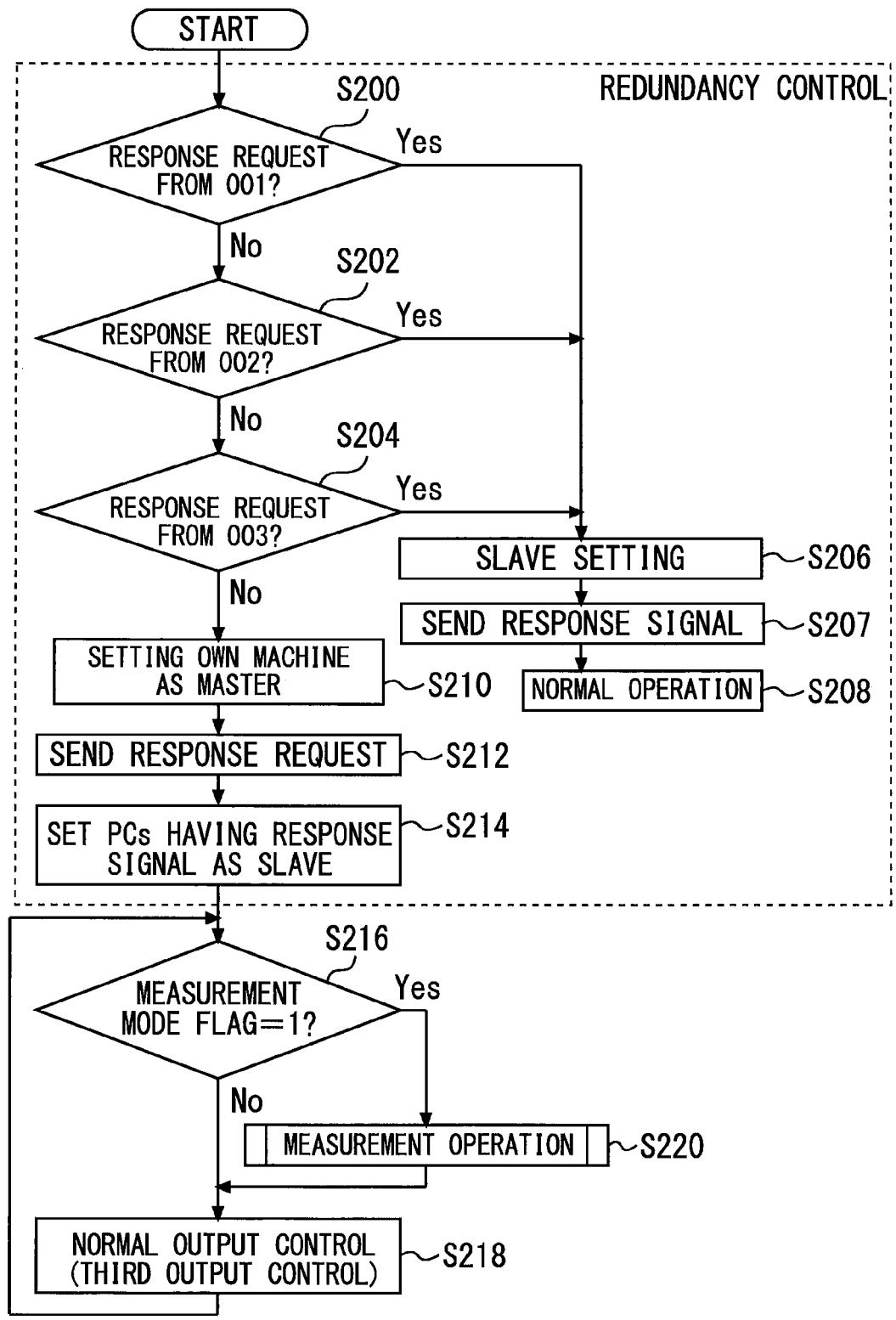
FIG. 15 is a flowchart illustrating a routine executed in the photovoltaic power generation system according to the second embodiment of the present invention.
Figure 16:
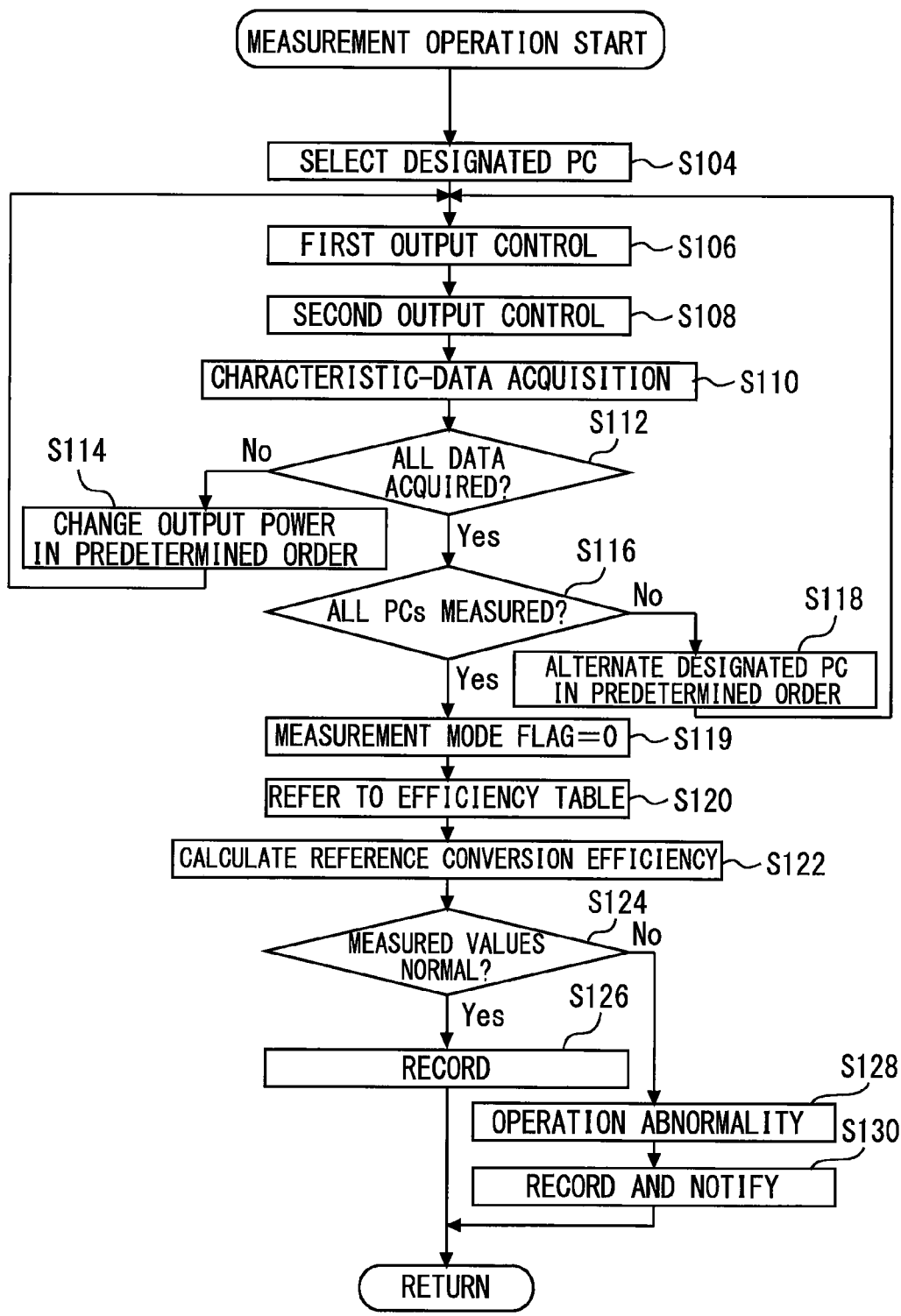
FIG. 16 is a flowchart illustrating a routine executed in the photovoltaic power generation system according to the second embodiment of the present invention.

FIGS. 15 and 16 are flowcharts showing routines executed in the photovoltaic power generation system 110 according to second embodiment of the present invention. The redundancy control according to the second embodiment may execute processing of steps S200 to S214 in the flowchart of FIG. 15. With reference to FIG. 15, as an example, the redundancy control executed by the control microcomputer 104 of the PC 2d will now be described.

In the second embodiment, a specific example will now be described about operation to be executed when each of the PCs 2a to 2c has malfunctions while the PC 2a prior to the malfunction has been selected as the master PC. For convenience of explanation, the PC 2d is also referred to as an "own machine" and the PCs 2a to 2c, 2e other than the PC 2d are also referred to as the "other machine". In the routine of FIG. 15, first, the control microcomputer 104 determines whether or not a response request is received from a PC having the address No. 001, i.e. from the PC 2a (step S200). In step S200, the determination result becomes "No" when the response request is not received during a predetermined determination time which is set in advance. Steps S202 and S204 performs the same processing as step S200 for each response request from the PC 2b having address No.002 and the PC 2c having No.003. In steps S200 to S204, the control microcomputer 104 determines whether or not the own machine PC 2d receives the response request from the other PCs 2a to 2c, 2e through the network system 40. If the response request is received from any one of the other machine PCs 2a to 2c, 2e in any of steps S200 to S204, the control microcomputer 104 sets the PC 2d to the slave PC (step S206), issues a return signal (step S207), and then performs normal operation (step S208). Accordingly, a PC which issues the response request among the other machine PCs 2a to 2c, 2e operates as the master PC. The PC 2d is controlled by the master PC as well as controlled by the MSC 3 in first embodiment.

If no response request is received in any of steps S200 to S204, the control microcomputer 104 sets the own machine PC 2d to a new master PC 2d (step S210). When the own machine PC 2d is set to the master PC 2d, the control microcomputer 104 sends the response request to the network (step S212). The control microcomputer 104 sets as a present slave PC each responding other machine PC which has sent a response signal in response to the response request from the own machine PC 2d among the plurality of PCs 2a to 2e (step S214). There are various levels of network failure, one failure therein may be a severe case where operation is totally impossible, and another failure therein may be a slight case where only some operations are impossible. An example of specific processing of the second embodiment is assumed that, for convenience of explanation, although each of the PCs 2a to 2c has an abnormality in processing to operate as the master PC, each of the PCs 2a to 2c outputs return signals and can operate as the slave PC. In such cases, the PC 2d sets each of the PCs 2a to 2c, 2e as the slave-PC.

It should be noted that, although FIG. 15 has been described the control contents of the control microcomputer 104 of the PC 2d as an example, the same processing is also executed in each control microcomputer 104 of the other PCs 2a to 2c, 2e. In other words, the control microcomputer 104 first waits for the response request from "PCs whose address numbers are lower than that of the own machine PC", similar to steps S200 to S204. The own machine PC may be set to the slave PC if the response requirement from the "PCs whose address numbers are lower than that of the own machine PC" is received, and the own machine PC may be set to the master PC if the response request from the "PCs whose address numbers are lower than that of the own machine PC" cannot be received. This allows the plurality of PCs 2a to 2e to perform automatically assignments of master and slave.

When setting of the slave PCs 2a to 2c, 2e is completed, then the control microcomputer 104 of the PC 2d determines whether or not "1" is set to the measurement mode flag (step S216). Processing in step S216 can be similar to the processing which the MSC 3 executes in step S100 on the first embodiment.

If a determination result in step S216 is "No", then the control microcomputer 104 of the PC 2d executes the normal output control (step S218). Processing in step S218 can be similar to the processing which the MSC 3 executes in step S102 on the first embodiment.

If the determination result in step S216 is "Yes", the control microcomputer 104 of the PC 2d starts measurement operation (step S220). FIG. 16 is a flowchart illustrating a measurement operation processing of step S220. FIG. 16 is a subroutine configured of contents in step S220 in FIG. 15. The contents of the flowchart of FIG. 16 is similar to the flowchart of FIG. 10 in the first embodiment. That is, the control microcomputer 104 stores program data equivalent to the program data for executing the flowchart of FIG. 10 in the first embodiment.

Similar to the modifications applied to the MSC 3 in the first embodiment, the control contents of the control microcomputer 104 in the second embodiment may be modified.

Figure 18:
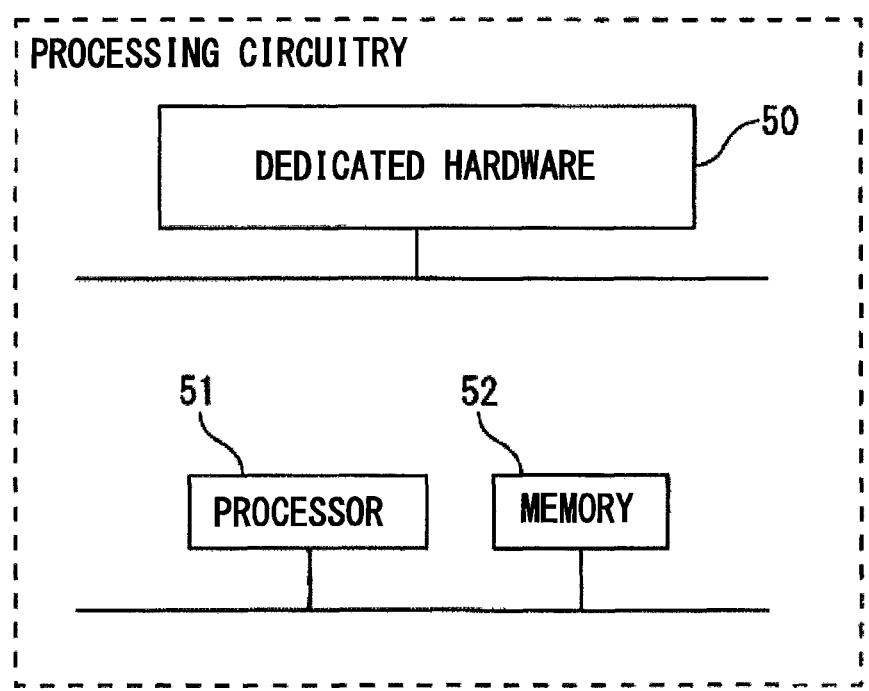
FIG. 18 is a block diagram illustrating a hardware configuration example of the MSC according to the first embodiment of the present invention.

FIG. 18 is a block diagram illustrating a hardware configuration example of the MSC 3 according to the first embodiment of the present invention.

The function of the MSC 3 is achieved by processing circuitry. The processing circuitry may be a dedicated hardware 50. The processing circuitry may include a processor 51 and a memory 52. The processing circuitry may be partially formed as the dedicated hardware 50 and may further include the processor 51 and the memory 52. FIG. 18 illustrates an example in which the processing circuitry is partially formed as the dedicated hardware 50 and includes the processor 51 and the memory 52.

If at least a part of the processing circuitry is at least one dedicated hardware 50, the processing circuitry may include, for example, a single circuit, a composite circuit, a programmed processor, a parallel programmed processor, an ASIC, a FPGA, or combinations thereof.

When the processing circuitry includes at least one processor 51 and at least one memory 52, each function of the MSC 3 is achieved by software, firmware, or a combination of software and firmware. The software and the firmware are written as programs and stored in memory 52. The processor 51 achieves each function by reading and executing the programs stored in the memory 52. The processor 51 may be also referred to as a CPU (Central Processing Unit), a central processing unit, a processing unit, an arithmetic unit, a microprocessor, a microcomputer, and DSP. The memory 52 includes, for example, nonvolatile or volatile semiconductor memories such as RAMs, ROMs, flash memories, EPROMs, and EEPROMs.

In this manner, the processing circuitry can achieve each function of the MSC 3 by hardware, software, firmware, or a combination thereof.

It should be noted that each function of the control microcomputer 104 included in the PC 2a to 2e according to the second embodiment may also be achieved by the same processing circuitry as the processing circuitry shown in FIG. 18.

In the first embodiment, the MSC 3 starts executing the first output control, and thereafter starts executing the second output control. Further, in the second embodiment, the master PC 2d starts executing the first output control, and thereafter starts executing the second output control. However, which of the first output control and the second output control is executed earlier is not limited in the first and second embodiments. It is sufficient to execute the first output control so as to overlap the second output control in time, and thereby to create a state in which "the remaining PCs share the power generation fluctuation amount of the designated PC". This allows the entire photovoltaic power generation systems 10, 100 to be balanced for the power generation fluctuation amount of the designated PC 2a. Accordingly, as a modification, the MSC 3 according to the first embodiment or the master PC 2d according to the second embodiment may start to execute the second output control earlier and thereafter to execute the first output control, after the selection of the designated PC 2a. As another modification, the MSC 3 or the master PC 2d may start executing the first output control and the second output control simultaneously. In either case, it is preferable that the first output control and the second output control are executed within a range not exceeding the total instructed power generation amount P0.

The control procedure of the photovoltaic power generation systems 10, 110 according to the first and second embodiments may be provided as a photovoltaic power generation method according to an embodiment. The photovoltaic power generation method according to the embodiment can also be implemented by adding control programs or the like to an existing photovoltaic power generation system after installation thereof. The photovoltaic power generation method according to the embodiment includes a first step and a second step. The first step is to measure the input/output electrical characteristics of the designated PC 2a while the first output control adjusts the output power of the designated PC 2a to a predetermined output power amount. The second step is to adjust the output power of the remaining PCs 2b to 2e so that the remaining PC 2b to 2e other than the designated PC 2a share the power generation fluctuation amount due to adjustment of the designated PC 2a to the predetermined output power amount during measurements of the input and output electrical characteristics. These first and second steps may be performed overlapping each other in time. One of the first step and the second step may start executing earlier than the other, or they may start executing at the same time.

It should be noted that, only "redundancy control" in the second embodiment may be implemented alone while separating it from a purpose of measuring the input/output electrical characteristics of the plurality of PCs 2a to 2e. This redundancy control can be applied to any photovoltaic power generation system having a master PC and a slave PC.

REFERENCE SIGNS LIST 1a to 1e Photovoltaic cell array
2a to 2e Power conditioner (PC)
2a Designated power conditioner (designated PC)
2d Master power conditioner (master PC)
3 Main site controller (MSC)
4 Inverter control circuit
5 Inverter circuit
6 Ammeter
6a Power conditioner group
6b Power conditioner group
7 Voltmeter
10,110 Photovoltaic power generation system
11 First reference conversion efficiency characteristic
12 Second reference conversion efficiency characteristic
13 Third reference conversion efficiency characteristic
20 Electric power grid
30 Cloud
31 Shade
40 Network system
50 Dedicated hardware
51 Processor
62 Memory
63 High order device
64 Data storage device
100 Evaluation system
101 Photovoltaic cell simulator
102 Virtual grid
104 Control microcomputer
P0 Total instructed power generation amount
Qm Operating point (maximum generated power operating point)
Qr Operating point (output suppressing control operating point)
S1 Measurement start signal

The invention claimed is:

1. A photovoltaic power generation system comprising: a plurality of photovoltaic cell arrays:
a plurality of power conditioners connected respectively with the plurality of photovoltaic cell arrays;
and a master power conditioner connected to the plurality of power conditioners, the master power conditioner being configured to execute
a first output control to sequentially adjust output power of a designated power conditioner to a plurality of predetermined output power amounts being set in advance, the designated power conditioner being a part of the plurality of power conditioners and being selected from the plurality of power conditioners,
a second output control to adjust output power from a remaining power conditioner which is other than the designated power conditioner among the plurality of power conditioners, the second output power control being such that the remaining power conditioner compensates power generation fluctuation amounts caused by sequentially adjusting the output power of the designated power conditioner to the plurality of predetermined output power amounts, and wherein the first output control is executed so as to overlap the second output control in time, and
wherein at least one of the master power conditioner and the designated power conditioner is configured to execute characteristic-data acquisition to acquire an input/output electrical characteristic of the designated power conditioner during execution of the first output control.

2. The photovoltaic power generation system according to claim 1,
wherein the plurality of predetermined output power amounts includes a first predetermined output power amount and a second predetermined output power amount different from the first predetermined output power amount,
wherein the first output control sequentially adjusts the output power of the designated power conditioner to the first predetermined output power amount and the second predetermined output power amount in a decreasing or increasing, order, and
wherein the characteristic-data acquisition includes obtaining a first input/output electrical characteristic of the designated power conditioner in response to adjustment to the first predetermined output power amount, and a second input/output electrical characteristic of the designated power conditioner in response to adjustment to the second predetermined output power amount.

3. The photovoltaic power generation system according to claim 1,
wherein the master power conditioner is configured to alternate the designated power conditioner among the plurality of power conditioners in a predetermined order.

4. The photovoltaic power generation system according to claim 3,
wherein the characteristic-data acquisition acquires the input/output electrical characteristic of the designated power conditioner for each of the plurality of predetermined output power amounts, and
wherein the master power conditioner is configured to execute the characteristic-data acquisition for each of the plurality of the predetermined output power amounts with respect to the designated power conditioner, and thereafter alternate the designated power conditioner in accordance with the predetermined order.

5. The photovoltaic power generation system according to claim 1,
wherein the master power conditioner is configured to
acquire a total required power generation amount for photovoltaic power generation system,
execute the first output control,
acquire a shared power generation amount which is a remaining power generation amount calculated by subtracting the predetermined output power amount from the total required power generation amount, and
execute the second output control with respect to the remaining power conditioner for causing the remaining power conditioner to share the shared power generation amount during execution of the first output control.

6. The photovoltaic power generation system according to claim 1,
wherein the master power conditioner is configured to
execute a third output control such that the plurality of power conditioners share a total required power generation amount required to the photovoltaic power generation system by adjusting each output power of the plurality of power conditioners variably when the master power conditioner does not receive a predetermined measurement start signal, and
execute the first output control and the second output control when the master power conditioner receives the measurement start signal.

7. A photovoltaic power generation system, comprising:
a plurality of photovoltaic cell arrays;
a plurality of power conditioners connected respectively with the plurality of photovoltaic cell arrays; and
a master power conditioner connected to the plurality of power conditioners, the master power conditioner being configured to execute
a first output control to adjust output power of a designated power conditioner to a predetermined output power amount being set in advance, the designated power conditioner being a part of the plurality of power conditioners and being selected from the plurality of power conditioners,
a second output control to adjust output power from a remaining power conditioner which is other than the designated power conditioner among the plurality of power conditioners, the second output power control being such that the remaining power conditioner compensates a power generation fluctuation amount caused by adjusting the output power of the designated power conditioner to the predetermined output power amount, and
wherein the first output control is executed so as to overlap the second output control in time, and
wherein at least one of the master power conditioner and the designated power conditioner is configured to execute characteristic-data acquisition to acquire an input/output electrical characteristic of the designated power conditioner during execution of the first output control,
wherein the input/output electrical characteristic includes conversion efficiency defined based on a ratio of input DC power inputted to the designated power conditioner and output AC power from the designated power conditioner corresponding to the input DC power,
wherein the master power conditioner is configured to
store, in advance, a first reference conversion efficiency characteristic defining a relationship between output power and the conversion efficiency when the input DC voltage is first DC voltage, and
determine whether or not difference is within a predetermined range being set in advance, the difference is between the first reference conversion efficiency characteristic and the conversion efficiency obtained when the input DC voltage in the designated power conditioner is the first DC voltage.

8. The photovoltaic power generation system according to claim 7,
wherein the master power conditioner stores, in advance, a second reference conversion efficiency characteristic defining a relationship between output power and the conversion efficiency when the input DC voltage is second DC voltage different from the first DC voltage,
wherein the master power conditioner executes a reference conversion efficiency calculation to calculate an intermediate conversion efficiency characteristic representing a relationship between output power and the conversion efficiency when the input DC voltage is intermediate DC voltage between the first DC voltage and the second DC voltage, and
wherein the reference conversion efficiency calculation is configured to
acquire a first coefficient corresponding to difference between the first DC voltage and the intermediate DC voltage, and a second coefficient corresponding to difference between the second DC voltage and the intermediate DC voltage, and
calculate the intermediate conversion efficiency characteristic based on a first value and a second value, the first value is based on the first coefficient and the first reference conversion efficiency characteristic, and the second value is based on the second coefficient and the second reference conversion efficiency characteristic.

9. A photovoltaic power generation system, comprising:
a plurality of photovoltaic cell arrays;
a plurality of power conditioners connected respectively with the plurality of photovoltaic cell arrays; and
a master power conditioner connected to the plurality of power conditioners, the master power conditioner being configured to execute
a first output control to adjust output power of a designated power conditioner to a predetermined output power amount being set in advance, the designated power conditioner being a part of the plurality of power conditioners and being selected from the plurality of power conditioners,
a second output control to adjust output power from a remaining power conditioner which is other than the designated power conditioner among the plurality of power conditioners, the second output power control being such that the remaining power conditioner compensates a power generation fluctuation amount caused by adjusting the output power of the designated power conditioner to the predetermined output power amount, and
wherein the first output control is executed so as to overlap the second output control in time, and
wherein at least one of the master power conditioner and the designated power conditioner is configured to execute characteristic-data acquisition to acquire an input/output electrical characteristic of the designated power conditioner during execution of the first output control,
wherein the master power conditioner is configured to
execute a third output control such that the plurality of power conditioners share a total required power generation amount required to the photovoltaic power generation system by adjusting each output power of the plurality of power conditioners variably when the master power conditioner does not receive a predetermined measurement start signal,
execute the first output control and the second output control when the master power conditioner receives the measurement start signal,
execute the first output control and the second output control in response to the measurement start signal when the master power conditioner receives the measurement start signal during execution of the third output control, execute the second output control for the remaining power conditioner in parallel with alternation in which the designated power conditioner is alternated in a predetermined order so that each of the plurality of power conditioners experiences the first output control, execute the characteristic-data acquisition in each case where each of the plurality of power conditioners experiences the designated power conditioner, and resume the third output control after completing each characteristic-data acquisition of the plurality of power conditioners.

10. A photovoltaic power generation system comprising:
a plurality of photovoltaic cell arrays;
a plurality of power conditioners connected respectively with the plurality of photovoltaic ceil arrays; and
a network system to communicate the plurality of power conditioners with each other, and
wherein the plurality of power conditioners include a master power conditioner and a slave power conditioner,
wherein the master power conditioner is configured to execute
a first output control to sequentially adjust output power from a designated power conditioner among the plurality of power conditioners to a plurality of predetermined output power amounts being set in advance,
and a second output control to adjust output power from a remaining power conditioner which is other than the designated power conditioner among the plurality of power conditioners, the second output power control being such that the remaining power conditioner compensates power generation fluctuation amounts caused by sequentially adjusting the output power of the designated power conditioner to the plurality of predetermined output power amounts, wherein the first output control is executed so as to overlap the second output control in time, and wherein at least one of the master power conditioner and the designated power conditioner is configured to execute characteristic-data acquisition, the characteristic-data acquisition acquires an input/output electrical characteristic of the designated power conditioner during execution of the first output control.

11. The photovoltaic power generation system according to claim 10,
wherein each of the plurality of power conditioners is configured to execute redundancy control to select a next master power conditioner from a plurality of slave power conditioners.

12. A photovoltaic power generation method comprising:
measuring an input/output electrical characteristic of a designated power conditioner in a state where output power of the designated power conditioner is sequentially adjusted to a plurality of predetermined output power amounts being set in advance, the designated power conditioner being selected from a plurality of power conditioners connected respectively to a plurality of photovoltaic cell arrays, adjusting output power of a remaining power conditioner so that the remaining power conditioner other than the designated power conditioner shares power generation fluctuation amounts caused by sequentially adjusting the output power of the designated power conditioner to the plurality of predetermined output power amounts.

13. A photovoltaic power generation system, comprising:
a plurality of photovoltaic cell arrays;
a plurality of power conditioners connected respectively with the plurality of photovoltaic cell arrays; and
a master power conditioner connected to the plurality of power conditioners, the master power conditioner being configured to execute
a first output control to adjust output power of a designated power conditioner to a predetermined output power amount being set in advance, the designated power conditioner being a part of the plurality of power conditioners and being selected from the plurality of power conditioners,
a second output control to adjust output power from a remaining power conditioner which is other than the designated power conditioner among the plurality of power conditioners, the second output power control being such that the remaining power conditioner compensates a power generation fluctuation amount caused by adjusting the output power of the designated power conditioner to the predetermined output power amount, and
wherein the first output control is executed so as to overlap the second output control in time, and
wherein at least one of the master power conditioner and the designated power conditioner is configured to execute characteristic-data acquisition to acquire an input/output electrical characteristic of the designated power conditioner during execution of the first output control,
wherein the input/output electrical characteristic includes conversion efficiency defined based on a ratio of input DC power inputted to the designated power conditioner and output AC power from the designated power conditioner corresponding to the input DC power,
wherein the master power conditioner is configured to
acquire a total required power generation amount for photovoltaic power generation system,
execute the first output control, acquire a shared power generation amount which is a remaining power generation amount calculated by subtracting the predetermined output power amount from the total required power generation amount,
execute the second output control with respect to the remaining power conditioner for causing the remaining power conditioner to share the shared power generation amount during execution of the first output control,
execute a third output control such that the plurality of power conditioners share a total required power generation amount required to the photovoltaic power generation system by adjusting each output power of the plurality of power conditioners variably when the master power conditioner does not receive a predetermined measurement start signal,
execute the first output control and the second output control when the master power conditioner receives the measurement start signal,
store, in advance, a first reference conversion efficiency characteristic defining a relationship between output power and the conversion efficiency when the input DC voltage is first DC voltage, and
determine whether or not difference is within a predetermined range being set in advance, the difference is between the first reference conversion efficiency characteristic and the conversion efficiency obtained when the input voltage in the designated power conditioner is the first DC voltage.

14. A photovoltaic power generation system comprising:
a plurality of photovoltaic cell arrays;
a plurality of power conditioners connected respectively with the plurality of photovoltaic cell arrays;
a master power conditioner connected to the plurality of power conditioners; and
a network system to communicate the plurality of power conditioners with each other, and
wherein the plurality of power conditioners include a master power conditioner and a slave power conditioner,
wherein the master power conditioner is configured to
execute a first output control to adjust output power from a designated power conditioner among the plurality of power conditioners to a predetermined output power amount being set in advance, and
a second output control to adjust output power from a remaining power conditioner which is other than the designated power conditioner among the plurality of power conditioners, the second output power control being such that the remaining power conditioner compensates a power generation fluctuation amount caused by adjusting the output power of the designated power conditioner to the predetermined output power,
wherein the first output control is executed so as to overlap the second output control in time,
wherein at least one of the master power conditioner and the designated power conditioner is configured to execute characteristic-data acquisition, the characteristic-data acquisition acquires an input/output electrical characteristic of the designated power conditioner during the execution of the first output control,
wherein the master power conditioner is configured to
execute a third output control such that the plurality of power conditioners share a total required power generation amount required to the photovoltaic power generation system by adjusting each output power of the plurality of power conditioners variably when the master power conditioner does not receive a predetermined measurement start signal,
execute the first output control and the second output control when the master power conditioner receives the measurement start signal,
execute the first output control and the second output control in response to the measurement start signal when the master power conditioner receives the measurement start signal during execution of the third output control,
execute the second output control for the remaining power conditioner in parallel with alternation in which the designated power conditioner is alternated in a predetermined order so that each of the plurality of power conditioners experiences the first output control,
execute the characteristic-data acquisition in each case where each of the plurality of power conditioners experiences the designated power conditioner,
resume the third output control after completing each characteristic-data acquisition of the plurality of power conditioners,
calculate an actual conversion efficiency using each of the input/output electrical characteristic acquired by the characteristic data acquisition, and
determine whether or not each of the plurality of power conditioners is normal based on a difference between the actual conversion efficiency and a reference conversion efficiency.

* * * * *